(12) United States Patent
Tagata et al.

(10) Patent No.: US 12,497,143 B2
(45) Date of Patent: Dec. 16, 2025

(54) MARINE PROPULSION SYSTEM AND MARINE VESSEL

(71) Applicant: YAMAHA HATSUDOKI KABUSHIKI KAISHA, Iwata (JP)

(72) Inventors: Akihiro Tagata, Shizuoka (JP); Yoshinori Yagi, Shizuoka (JP); Hirotaka Tamoto, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 18/763,259

(22) Filed: Jul. 3, 2024

(65) Prior Publication Data

US 2025/0019053 A1    Jan. 16, 2025

(30) Foreign Application Priority Data

Jul. 10, 2023    (JP) .................................. 2023-113303

(51) Int. Cl.
*B63B 79/40*     (2020.01)
*B63B 79/15*     (2020.01)
*B63H 21/21*     (2006.01)

(52) U.S. Cl.
CPC .............. *B63B 79/40* (2020.01); *B63B 79/15* (2020.01); *B63H 21/21* (2013.01); *B63H 2021/216* (2013.01)

(58) Field of Classification Search
CPC ......... B63B 79/40; B63B 79/15; B63H 21/21; B63H 2021/216
See application file for complete search history.

(56) References Cited

U.S. PATENT DOCUMENTS

| | | |
|---|---|---|
| 11,554,843 B2 | 1/2023 | Inoue |
| 2003/0054704 A1 | 3/2003 | Kanno |
| 2009/0298359 A1 | 12/2009 | Hiroshima et al. |
| 2021/0394877 A1 | 12/2021 | Kadota et al. |

FOREIGN PATENT DOCUMENTS

| | | | |
|---|---|---|---|
| JP | 06-211190 A | 8/1994 |
| JP | 2003-097309 A | 4/2003 |
| JP | 2003-154993 A | 5/2003 |
| JP | 2004-291688 A | 10/2004 |
| JP | 5138469 B2 | 2/2013 |
| JP | 2017058322 A | 3/2017 |
| JP | 2021-195076 A | 12/2021 |

OTHER PUBLICATIONS

Official Communication issued in corresponding European Patent Application No. 24184009.9, mailed on Dec. 11, 2024, 7 pages.

*Primary Examiner* — Timothy Hannon
(74) *Attorney, Agent, or Firm* — Keating & Bennett, LLP

(57) ABSTRACT

A marine propulsion system includes a propulsion device, an up-and-down movement sensor, and a controller configured or programmed to control driving of the propulsion device and perform a wave control including an attitude control to reduce an up-and-down attitude change of a hull by temporarily reducing a vessel speed based on a measurement result of the up-and-down movement sensor each time a marine vessel rides over a wave. The controller is configured or programmed to, in the wave control, perform the attitude control when it is determined that a wave condition is a head wave, and not perform the attitude control when it is determined that the wave condition is a following wave.

20 Claims, 10 Drawing Sheets

FIG.3 CONTROL STRUCTURE FOR ATTITUDE CONTROL

MARINE PROPULSION SYSTEM AND MARINE VESSEL

CROSS REFERENCE TO RELATED APPLICATIONS

This application claims the benefit of priority to Japanese Patent Application No. 2023-113303 filed on Jul. 10, 2023. The entire contents of this application are hereby incorporated herein by reference.

BACKGROUND OF THE INVENTION

1. Field of the Invention

The present invention relates to marine propulsion systems and marine vessels that each control a propulsion speed.

2. Description of the Related Art

A marine vessel including a propulsion device, the driving of which is controlled according to a wave condition, is known in general. Such a marine vessel is disclosed in Japanese Patent Laid-Open No. 2003-097309, for example.

Japanese Patent Laid-Open No. 2003-097309 discloses a marine vessel including an outboard motor, an engine rotation speed sensor to detect the rotation speed of an engine of the outboard motor, and a controller. The controller detects the amount of a wave load on the engine, which indirectly indicates an impact that a hull receives from waves, based on the detection result of the engine rotation speed sensor, and corrects a throttle opening according to the amount of wave load.

In the marine vessel described in Japanese Patent Laid-Open No. 2003-097309, a simple control is performed, taking into account the magnitude of the impact that the hull receives as a wave condition, but an appropriate control is not sufficiently performed according to the wave condition, such that the stability of the hull is not sufficiently maintained. Therefore, it has been desired to improve the stability of the hull to improve the ride comfort when waves are occurring.

SUMMARY OF THE INVENTION

Example embodiments of the present invention provide marine propulsion systems and marine vessels that each improve the stability of hulls to improve the ride comfort when waves are occurring.

A marine propulsion system according to an example embodiment of the present invention includes a propulsion device to be provided on or in a hull, an up-and-down movement sensor to measure at least one of an up-and-down speed or an up-and-down acceleration of the hull, and a controller configured or programmed to control driving of the propulsion device, and perform a wave control including an attitude control to reduce an up-and-down attitude change of the hull by temporarily reducing a vessel speed based on a measurement result of the up-and-down movement sensor each time a marine vessel rides over a wave when waves are occurring. The controller is configured or programmed to, in the wave control, make a wave direction determination to determine whether a wave condition relative to the hull is a head wave or a following wave based on at least the measurement result of the up-and-down movement sensor, perform the attitude control when it is determined that the wave condition is the head wave, and not perform the attitude control when it is determined that the wave condition is the following wave.

A marine propulsion system according to an example embodiment of the present invention includes the controller configured or programmed to perform the wave control including the attitude control to reduce the up-and-down attitude change of the hull by temporarily reducing the vessel speed based on the measurement result of the up-and-down movement sensor each time the marine vessel rides over a wave, and the controller is configured or programmed to, in the wave control, make the wave direction determination to determine whether the wave condition relative to the hull is the head wave or the following wave based on at least the measurement result of the up-and-down movement sensor, perform the attitude control when it is determined that the wave condition is the head wave, and not perform the attitude control when it is determined that the wave condition is the following wave. Accordingly, a distinction is made between a following wave and a head wave, and the hull is stabilized by temporarily reducing the vessel speed each time the marine vessel rides over a wave when head waves that tend to cause a large impact on the hull are occurring. Furthermore, when following waves are occurring in which the hull tends to become unstable when the vessel speed is reduced, the vessel speed is prevented from being temporarily reduced each time the marine vessel rides over a wave. Therefore, a control is performed according to the direction of the waves, taking into account the direction of the waves not conventionally taken into account, and thus when waves are occurring, the stability of the hull is improved to improve the ride comfort. Furthermore, the attitude control allows the vessel speed to be temporarily reduced each time the marine vessel rides over a wave when head waves are occurring, and thus the possibility that the marine vessel rides over a wave with great force is reduced or prevented, for example.

In a marine propulsion system according to an example embodiment of the present invention, the wave control preferably includes a speed control to adjust the vessel speed to reach a target vessel speed, which is a target value of the vessel speed, and the controller is preferably configured or programmed to perform the speed control regardless of the head wave or the following wave. Accordingly, the attitude control is performed in a case of the head wave, and the speed control is performed regardless of the head wave or the following wave such that the speed is reduced when waves are occurring. Thus, when waves are occurring, the stability of the hull is further improved to further improve the ride comfort.

In such a case, the speed control preferably includes a control to adjust the vessel speed when the marine vessel rides over a wave, and the controller is preferably configured or programmed to perform the speed control regardless of whether a result of the wave direction determination is the head wave or the following wave. Accordingly, the attitude control is performed in a case of the head wave, and the speed control is performed regardless of the head wave or the following wave such that the impact is further reduced. Consequently, when waves are occurring, the stability of the hull is further improved to further improve the ride comfort.

In a marine propulsion system in which the wave control includes the speed control to adjust the vessel speed based on the measurement result of the up-and-down movement sensor to reduce the impact when the marine vessel rides over a wave, the controller is preferably configured or programmed to make the wave direction determination based on at least the target vessel speed to reduce an up-and-down acceleration and deceleration of the hull in the speed control. Accordingly, the wave direction determination is made based on the target vessel speed, which is the target value of the vessel speed to reduce the up-and-down acceleration and deceleration of the hull, and thus the up-and-down acceleration and deceleration of the hull is effectively reduced.

In a marine propulsion system including the controller configured or programmed to make the wave direction determination based on the target vessel speed, the target vessel speed preferably includes a limited target vessel speed in which a predetermined limit is placed on an amount of change of the vessel speed such that a difference between an actual vessel speed and the target value of the vessel speed is reduced. Accordingly, due to the limited target vessel speed in which the predetermined limit is placed on the amount of change of the vessel speed, sudden acceleration and deceleration of the marine vessel is reduced or prevented.

In a marine propulsion system in which the wave direction determination is made based on the target vessel speed, the controller is preferably configured or programmed to determine that the wave condition is the head wave and perform the attitude control when it is determined that a determination vessel speed difference, which is a difference between the target vessel speed and the vessel speed at a start of the speed control, is greater than a predetermined wave direction determination threshold, and determine that the wave condition is the following wave and not perform the attitude control when it is determined that the predetermined determination vessel speed difference is equal to or less than the wave direction determination threshold. Accordingly, it is appropriately determined whether the wave condition is the head wave that causes the vessel speed at the start of the speed control to be unlikely to reach the target vessel speed or the following wave that causes the vessel speed at the start of the speed control to be likely to reach the target vessel speed.

In a marine propulsion system including the controller configured or programmed to perform the speed control to adjust the vessel speed to the target vessel speed regardless of a head wave or a following wave, an upper limit is preferably set on a rate of change of an actual vessel speed toward the target vessel speed, and the controller is preferably configured or programmed to perform a control to increase the upper limit for the rate of change when a difference between the target vessel speed and the actual vessel speed is equal to or greater than a first threshold. Accordingly, the vessel speed quickly follows the target vessel speed according to the wave condition.

In a marine propulsion system according to an example embodiment of the present invention, when the speed control is being performed and the attitude control is not being performed even when the controller determines that the wave direction is the head wave, the controller is preferably configured or programmed to perform the attitude control in addition to the speed control when it is determined that the up-and-down speed or the up-and-down acceleration of the hull is equal to or higher than a second threshold based on the measurement result of the up-and-down movement sensor. Accordingly, as compared with a case in which only the speed control is performed, rapid deceleration and a decrease in an average speed are reduced when both the speed control and the attitude control are performed. Furthermore, the marine vessel rides over a small wave using only the speed control without the attitude control, and thus a speed change is further reduced to improve the stability of the hull. For a large wave at the second threshold or higher, both the attitude control and the speed control are performed, and thus as compared with a case in which only the speed control is performed, the hull is prevented from taking off from the water such that an impact and an attitude change after riding over a wave are reduced.

In a marine propulsion system in which the wave direction determination is made based on the target vessel speed, the controller is preferably configured or programmed to, in the speed control, adjust the vessel speed based on a moving average value of the up-and-down speed or the up-and-down acceleration of the hull to reduce an impact when the marine vessel rides over a wave, and set the target vessel speed based on the moving average value when making the wave direction determination. Accordingly, the moving average value of the up-and-down speed or the up-and-down acceleration of the hull is considered in the speed control, and thus the influence of an instantaneous change or a change in a relatively short period of time in the up-and-down speed or the up-and-down acceleration of the hull on the wave direction determination in the speed control is reduced or prevented.

In a marine propulsion system according to an example embodiment of the present invention, the propulsion device preferably includes at least one of an engine or an electric motor as a drive source to generate a thrust, and the controller is preferably configured or programmed to perform the attitude control by reducing an output of the engine or the electric motor to reduce the vessel speed. Accordingly, the attitude control is easily performed by adjusting the output of the engine or the electric motor to reduce the vessel speed.

A marine propulsion system according to an example embodiment of the present invention preferably further includes an attitude adjuster in the hull to adjust a pitch of the hull by changing a position of the attitude adjuster with respect to the hull to resist a water flow, and the controller is preferably configured or programmed to perform the attitude control to adjust an attitude of the hull by varying the pitch of the hull using the attitude adjuster when waves are occurring. Accordingly, as compared with a case in which the throttle valve is adjusted in the attitude control, the hull is stabilized using the attitude adjuster to reduce or prevent a decrease in the vessel speed.

In a marine propulsion system according to an example embodiment of the present invention, the controller is preferably configured or programmed to, in the wave control, make a high wave determination to determine whether or not the up-and-down speed or the up-and-down acceleration of the hull is equal to or higher than a predetermined high wave determination threshold based on the measurement result of the up-and-down movement sensor, and perform the attitude control regardless of a result of the wave direction determination when it is determined that the up-and-down speed or the up-and-down acceleration of the hull is equal to or higher than the predetermined high wave determination threshold. Accordingly, in a case of a high wave in which the hull is likely to become unstable, the attitude control is reliably performed regardless of a following wave or a head wave.

A marine propulsion system according to an example embodiment of the present invention preferably further includes an operator to receive an operation to start the wave control and an operation to terminate the wave control, and the controller is preferably configured or programmed to start or terminate the wave direction determination based on an operation on the operator. Accordingly, the operator allows the wave control to be easily started and terminated.

In a marine propulsion system according to an example embodiment of the present invention, the controller is preferably configured or programmed to maintain the vessel speed without performing the attitude control when it is determined that the wave condition is the following wave. Accordingly, the vessel speed is maintained in a case of the following wave, and thus the instability of the hull due to a decrease in the vessel speed in a case of the following wave is reduced or prevented.

In a marine propulsion system according to an example embodiment of the present invention, the propulsion device preferably includes an engine including a throttle valve, and the controller is preferably configured or programmed to, in the attitude control, perform a subtraction process to reduce an opening of the throttle valve based on the up-and-down speed of the hull so as to reduce the up-and-down attitude change of the hull. Accordingly, the opening of the throttle valve of the engine propulsion device is reduced in the attitude control such that the stability of the hull is improved to improve the ride comfort when waves are occurring.

In a marine propulsion system in which the wave control includes the speed control, the controller is preferably configured or programmed to, in the speed control, change the vessel speed based on a moving average value of the up-and-down speed or the up-and-down acceleration of the hull and an occurrence probability density distribution of a wave height to reduce an up-and-down acceleration and deceleration of the hull. Accordingly, the moving average value of the up-and-down speed or the up-and-down acceleration of the hull is considered in the speed control, and thus the influence of an instantaneous change or a change in a relatively short period of time in the up-and-down speed or the up-and-down acceleration of the hull on the wave direction determination is reduced or prevented. Furthermore, the amount of reduction in the up-and-down acceleration and deceleration of the hull is accurately determined by changing the vessel speed in consideration of the occurrence probability density distribution of a wave height.

A marine vessel according to an example embodiment of the present invention includes a hull, and a marine propulsion system on or in the hull. The marine propulsion system includes a propulsion device on or in the hull, an up-and-down movement sensor to measure at least one of an up-and-down speed or an up-and-down acceleration of the hull, and a controller configured or programmed to control driving of the propulsion device, and perform a wave control including an attitude control to reduce an up-and-down attitude change of the hull by temporarily reducing a vessel speed based on a measurement result of the up-and-down movement sensor each time the marine vessel rides over a wave. The controller is configured or programmed to, in the wave control, make a wave direction determination to determine whether a wave condition relative to the hull is a head wave or a following wave based on at least the measurement result of the up-and-down movement sensor, perform the attitude control when it is determined that the wave condition is the head wave, and not perform the attitude control when it is determined that the wave condition is the following wave.

A marine vessel according to an example embodiment of the present invention includes the controller configured or programmed to perform the wave control including the attitude control to reduce the up-and-down attitude change of the hull by temporarily reducing the vessel speed based on the measurement result of the up-and-down movement sensor each time the marine vessel rides over a wave, and the controller is configured or programmed to, in the wave control, make the wave direction determination based on at least the measurement result of the up-and-down movement sensor, perform the attitude control when it is determined that the wave condition is the head wave, and not perform the attitude control when it is determined that the wave condition is the following wave. Accordingly, a distinction is made between a following wave and a head wave, and the hull is stabilized by temporarily reducing the vessel speed each time the marine vessel rides over a wave when head waves that tend to cause a large impact on the hull are occurring. Furthermore, when following waves are occurring in which the hull tends to become unstable when the vessel speed is reduced, the vessel speed is prevented from being temporarily reduced each time the marine vessel rides over a wave. Therefore, a control is performed according to the direction of the waves, taking into account the direction of the waves, and thus when waves are occurring, the stability of the hull is improved to improve the ride comfort. Furthermore, the attitude control allows the vessel speed to be temporarily reduced each time the marine vessel rides over a wave when head waves are occurring, and thus the possibility that the marine vessel rides over a wave with great force is reduced or prevented, for example.

In a marine vessel according to an example embodiment of the present invention, the wave control preferably includes a speed control to adjust the vessel speed to a target vessel speed, which is a target value of the vessel speed, and the controller is preferably configured or programmed to perform the speed control regardless of the head wave or the following wave. Accordingly, the attitude control is performed in a case of the head wave, and the speed control is performed regardless of the head wave or the following wave such that the speed is reduced when waves are occurring. Thus, when waves are occurring, the stability of the hull is further improved to further improve the ride comfort.

In such a case, the speed control preferably includes a control to adjust the vessel speed to reduce an impact when the marine vessel rides over a wave, and the controller is preferably configured or programmed to perform the speed control regardless of whether a result of the wave direction determination is the head wave or the following wave. Accordingly, the attitude control is performed in a case of the head wave, and the speed control is performed regardless of the head wave or the following wave such that the impact is further reduced. Consequently, when waves are occurring, the stability of the hull is further improved to further improve the ride comfort.

In a marine vessel in which the wave control includes the speed control to adjust the vessel speed based on the measurement result of the up-and-down movement sensor to reduce the impact when the marine vessel rides over a wave, the controller is preferably configured or programmed to make the wave direction determination based on at least the target vessel speed. Accordingly, the wave direction determination is made based on the target vessel speed, which is the target value of the vessel speed, and thus the up-and-down acceleration and deceleration of the hull is effectively reduced.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Example embodiments of the present invention are hereinafter described with reference to the drawings.

First Example Embodiment

Figure 1:
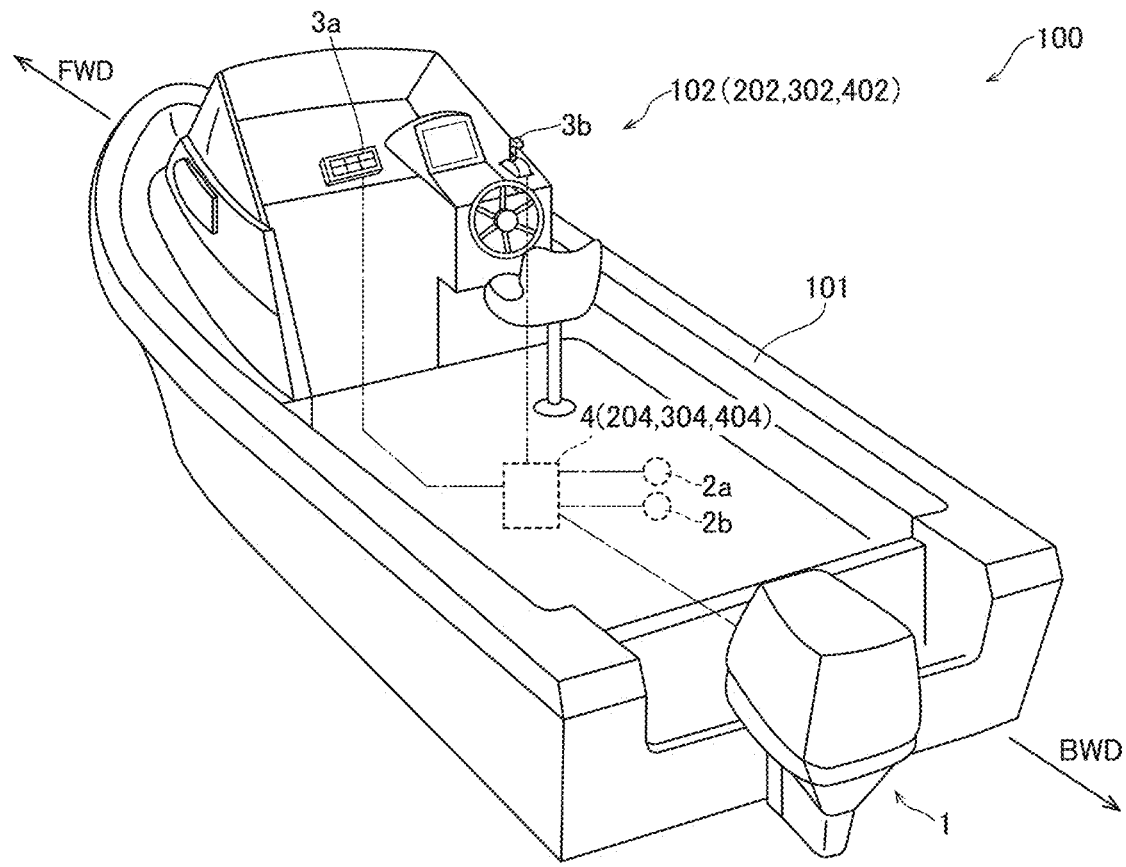
FIG. 1 is a perspective view showing a marine propulsion system according to first to fourth example embodiments of the present invention.

The structure of a marine vessel 100 including a marine propulsion system 102 according to a first example embodiment of the present invention is now described with reference to FIGS. 1 to 6. In FIG. 1, arrow FWD represents the forward movement direction of the marine vessel 100 (front side with reference to a hull 101), and arrow BWD represents the reverse movement direction of the marine vessel 100 (rear side with reference to the hull 101).

As shown in FIG. 1, the marine vessel 100 includes the hull 101 and the marine propulsion system 102 including a propulsion device 1. The marine propulsion system 102 is provided on or in the hull 101.

The propulsion device 1 is attached to a transom of the hull 101. The propulsion device 1 includes an outboard motor. That is, the marine vessel 100 is an outboard motorboat including an outboard motor as the propulsion device 1.

Figure 2:
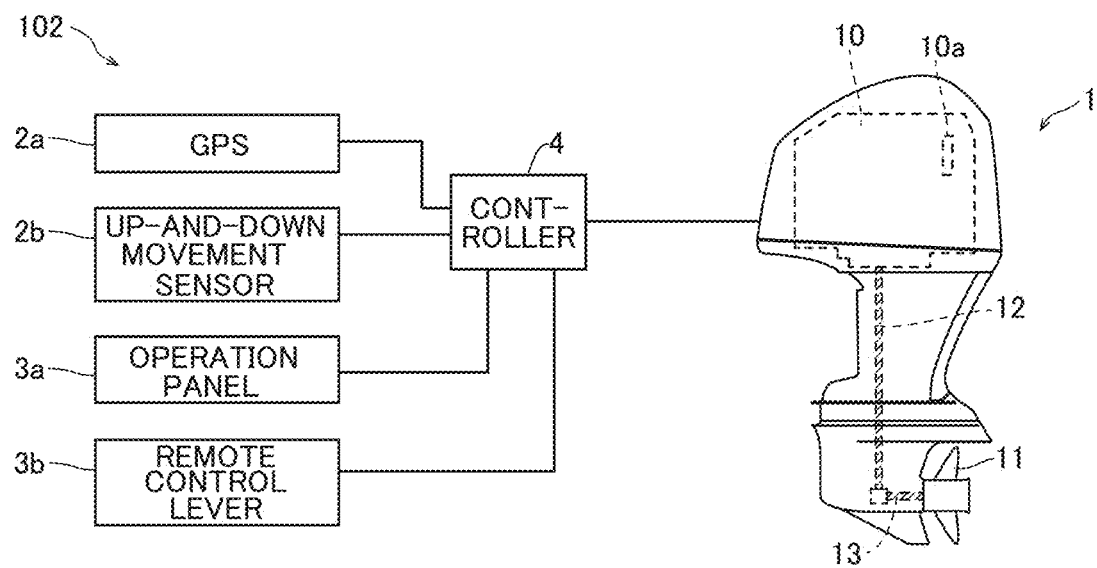
FIG. 2 is a block diagram of a marine propulsion system according to the first example embodiment of the present invention.

As shown in FIG. 2, the marine propulsion system 102 includes the propulsion device 1, a GPS 2a, an up-and-down movement sensor 2b, an operation panel 3a, a remote control lever 3b, and a controller 4 configured or programmed to control driving of the propulsion device 1. The operation panel 3a is an example of an "operator".

As shown in FIG. 2, the propulsion device 1 includes an engine 10, a propeller 11, a drive shaft 12, and a propeller shaft 13. The engine 10 may be an internal combustion engine including a throttle valve 10a, and generates a driving force by burning fuel and rotating a crankshaft (not shown). The opening of the throttle valve 10a is adjusted by the remote control lever 3b. The engine 10 includes a crank angle sensor (not shown) to measure an engine speed. The propeller 11 is rotationally driven by the driving force generated in the engine 10. The drive shaft 12 and the propeller shaft 13 transmit the driving force generated in the engine 10 to the propeller 11.

The GPS 2a is provided on the hull 101 and acquires position information about the hull 101. The controller 4 uses the position information to acquire the current vessel speed of the marine vessel 100. Acquisition of the vessel speed is not limited to using the GPS, but may also be performed using a vessel speed sensor (a sensor that detects a vessel speed through the water). The up-and-down movement sensor 2b measures at least one of the up-and-down speed or the up-and-down acceleration of the hull 101. As an example, the up-and-down movement sensor 2b includes an inertial measurement unit (IMU).

The operation panel 3a includes a plurality of switches. As a specific example, the operation panel 3a receives an operation to start a wave control described below and an operation to terminate the wave control.

The magnitude of the thrust of the propulsion device 1 (the opening of the throttle valve 10a) is adjusted by tilting a lever of the remote control lever 3b. In short, the remote control lever 3b is an operator to adjust the vessel speed. Instead of the remote control lever, a joystick, a steering operator with a paddle shift, etc. may be provided.

The controller 4 knows the status of the marine vessel 100 based on a signal acquired from each component of the marine propulsion system 102, and determines and transmits the magnitude of the propulsive force and the thrust direction of the propulsion device 1 to the propulsion device 1. As an example, the controller 4 includes a boat control unit (BCU) or a remote control ECU. The controller 4 includes a CPU and a memory.

The controller 4 according to the first example embodiment performs a wave control including an attitude control. The attitude control refers to a control to reduce an up-and-down attitude change of the hull 101 by temporarily reducing the vessel speed based on the measurement results of the up-and-down movement sensor 2b each time the marine vessel 100 rides over a wave when waves are occurring. In the attitude control using the throttle valve 10a, the hull 101 is prevented from taking off from the water by momentarily reducing a thrust to change the attitude (lower the bow) when riding over a wave. Even when the hull 101 does not take off from the water as a result of the speed reduction, there is an effect of reducing the momentum (vibration) of the hull 101 due to the speed reduction. Furthermore, in the attitude control using an attitude adjuster (a trim tab, for example), pitching is corrected to change the attitude adjuster according to the wave front. Moreover, the wave control includes a speed control to adjust the vessel speed to a target vessel speed, which is a target value of the vessel speed and is described below. The speed control refers to a control to adjust the vessel speed based on the measurement results of the up-and-down movement sensor 2b to reduce an impact when the hull 101 rides over each wave.

The wave control refers to a control using the attitude control and the speed control to reduce an up-and-down attitude change of the hull 101 and to reduce an impact applied to the hull 101. When performing the wave control, the controller 4 performs a control, taking into account a wave condition such as a following wave, a head wave, or a high wave.

The controller 4 of the marine propulsion system 102 according to the first example embodiment repeatedly and continuously performs the speed control from the start to the end of the wave control during the wave control. The wave control is started when a predetermined switch on the operation panel 3a is operated. The wave control is terminated when a predetermined switch on the operation panel 3a is operated.

The controller 4 of the marine propulsion system 102 according to the first example embodiment makes a wave direction determination in which it is determined whether the wave condition relative to the hull 101 is a head wave or a following wave based on at least the measurement results of the up-and-down movement sensor 2b in the wave control. The controller 4 of the marine propulsion system 102 performs the attitude control when it is determined that the wave condition is a head wave in the wave direction determination, and does not perform the attitude control when it is determined that the wave condition is a following wave in the wave direction determination.

The attitude control, the speed control, and the wave control are described below in detail in order.

Figure 3:
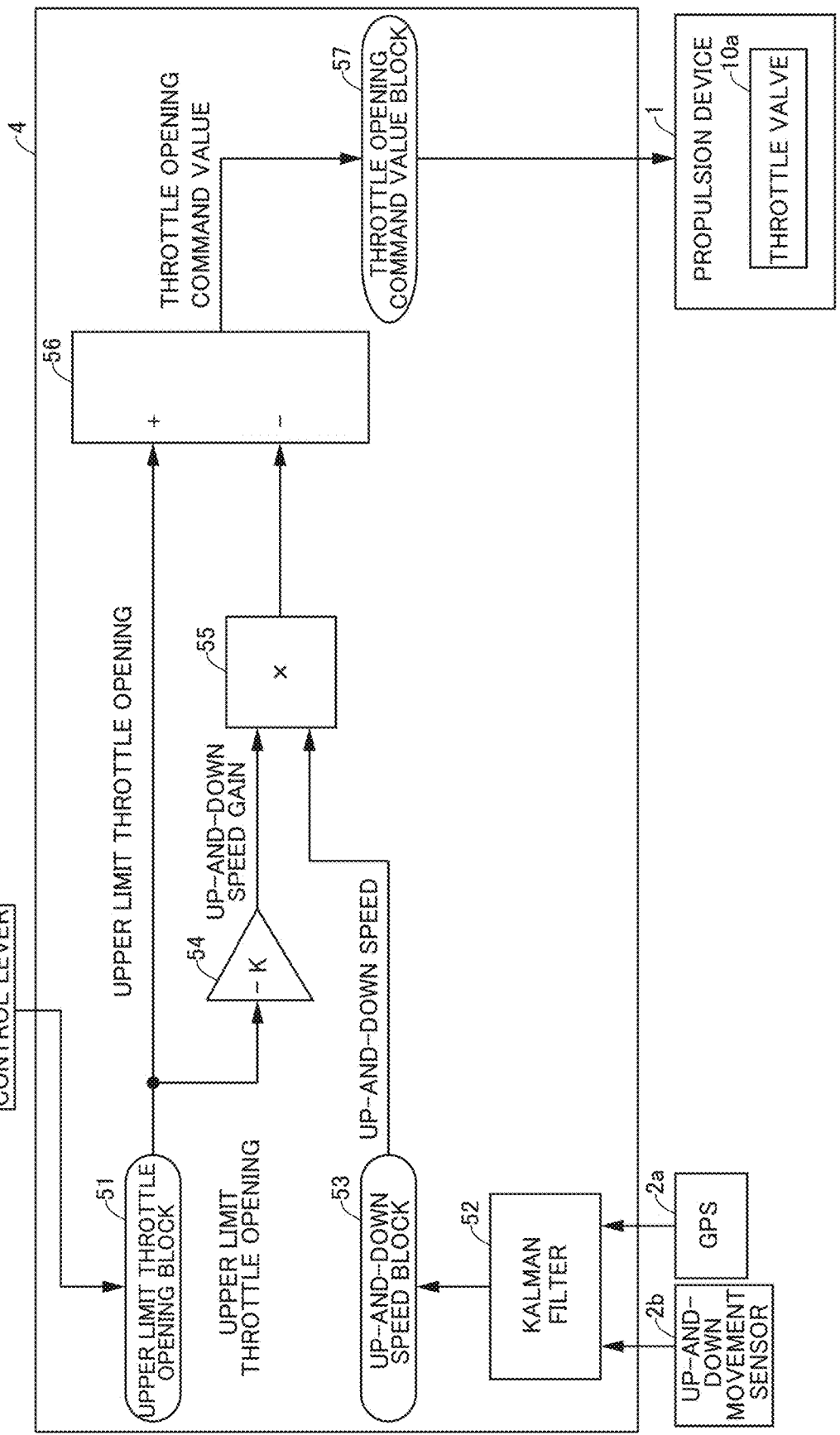
FIG. 3 is a diagram illustrating a control structure for an attitude control of a controller.

The control structure of the controller 4 to perform the attitude control is described with reference to FIG. 3. The controller 4 controls the opening of the throttle valve 10a (hereinafter referred to as a "throttle opening") based on the up-and-down speed of the marine vessel 100.

The controller 4 includes, as the control structure for the attitude control, an upper limit throttle opening block 51, a Kalman filter 52, an up-and-down speed block 53, a coefficient multiplier 54, a gain multiplier 55, a subtractor 56, and a throttle opening command value block 57.

In the attitude control, the controller 4 performs a subtraction process to reduce the opening of the throttle valve 10a based on the up-and-down speed of the hull 101 to reduce an up-and-down attitude change of the hull 101. The attitude control is described below in detail.

In the controller 4, first, the upper limit throttle opening block 51 sets, as the upper limit throttle opening, a throttle opening specified by the vessel user using the remote control lever 3b based on a signal transmitted from the remote control lever 3b. Furthermore, the upper limit throttle opening block 51 transmits the upper limit throttle opening to the coefficient multiplier 54 and the subtractor 56.

The Kalman filter 52 estimates the up-and-down speed of the marine vessel 100 based on the measurement results of the up-and-down movement sensor 2b and the GPS 2a, and the up-and-down speed block 53 transmits the estimated up-and-down speed to the gain multiplier 55. The coefficient multiplier 54 calculates an up-and-down speed gain (predetermined gain) by multiplying the upper limit throttle opening by an up-and-down speed gain coefficient, and transmits the calculated up-and-down speed gain to the gain multiplier 55. As an example, the up-and-down speed gain coefficient is set to a negative value "–K" with reference to the amount of throttle opening returned by a veteran vessel user when the hull 101 runs on a wave.

The gain multiplier 55 calculates a subtraction throttle opening by multiplying the up-and-down speed by the up-and-down speed gain, and transmits the calculated subtraction throttle opening to the subtractor 56. The subtractor 56 calculates a throttle opening command value by subtracting the subtraction throttle opening from the upper limit throttle opening, and the throttle opening command value block 57 transmits the calculated throttle opening command value to the propulsion device 1. The propulsion device 1 controls the throttle opening based on the throttle opening command value and adjusts the vessel speed of the marine vessel 100.

In the controller 4, the opening of the throttle valve 10a is controlled based on the throttle opening command value obtained by performing a subtraction process on the upper limit throttle opening using the subtraction throttle opening, and the subtraction throttle opening is obtained by multiplying the up-and-down speed by the up-and-down speed gain. Therefore, for example, as the marine vessel 100 runs on a large wave and the up-and-down speed of the hull 101 increases, the subtraction throttle opening increases, and consequently the throttle opening command value decreases. That is, as the up-and-down speed of the hull 101 increases, the throttle opening command value decreases, and the opening of the throttle valve 10a decreases. Consequently, the vessel speed of the marine vessel 100 is reduced. Thus, an impact caused by a water landing after the marine vessel 100 runs on a wave is alleviated.

When the marine vessel 100 runs on a wave, the throttle opening command value becomes smaller than the upper limit throttle opening. Thus, the opening of the throttle valve 10a is decreased, and the vessel speed of the marine vessel 100 is reduced. On the other hand, when the marine vessel 100 descends from the crest of a wave, the throttle opening command value becomes larger than the throttle opening command value when the marine vessel 100 runs on a wave so as to approach the upper limit throttle opening. Thus, the opening of the throttle valve 10a is increased, and the vessel speed of the marine vessel 100 is increased.

When the throttle opening command value is obtained, the marine vessel 100 decelerates too much when the subtraction throttle opening is constant and the vessel speed is low. On the other hand, the marine vessel 100 does not decelerate sufficiently when the vessel speed is high. In particular, in the latter case, an impact caused by a water landing after the marine vessel 100 runs on a wave is not sufficiently alleviated.

Therefore, the up-and-down speed gain used to obtain the subtraction throttle opening is calculated by multiplying the upper limit throttle opening by the up-and-down speed gain coefficient. Thus, the subtraction throttle opening changes according to the upper limit throttle opening. Specifically, when the upper limit throttle opening is large (that is, when the vessel speed is high), the subtraction throttle opening becomes large, and the throttle opening command value is significantly reduced, such that the marine vessel 100 is sufficiently decelerated. Consequently, an impact caused by a water landing after the marine vessel 100 runs on a wave is sufficiently alleviated. When the upper limit throttle opening is small (that is, when the vessel speed is low), the subtraction throttle opening becomes small, and excessive deceleration of the marine vessel 100 is reduced or prevented.

Even when the up-and-down speed gain is calculated by multiplying the vessel speed by the up-and-down speed gain coefficient instead of the upper limit throttle opening, the marine vessel 100 is sufficiently decelerated by increasing the subtraction throttle opening when the vessel speed is high. Therefore, it is also conceivable to calculate the up-and-down speed gain using the vessel speed instead of the upper limit throttle opening. However, when the attitude control is performed, the vessel speed changes as a result, and even when a disturbance is applied to the marine vessel 100, the vessel speed changes (in short, the vessel speed is not necessarily constant even when the throttle opening is constant). Thus, a deceleration gain calculated using the vessel speed becomes unstable, and consequently the attitude control may become unstable.

Therefore, as described above, the up-and-down speed gain is calculated using the upper limit throttle opening instead of the vessel speed. For example, even when the attitude control is performed or a disturbance is applied to the marine vessel 100, the vessel user does not change the operation amount of the remote control lever 3b in principle, and thus the deceleration gain calculated using the upper limit throttle opening is stable. Consequently, the attitude control is stabilized. The up-and-down speed gain is calculated by multiplying the upper limit throttle opening by the up-and-down speed gain coefficient, and thus the up-and-down speed gain is proportional to the upper limit throttle opening.

When the subtraction throttle opening is subtracted from the upper limit throttle opening when the hull 100 runs on a wave, the acceleration and deceleration of the marine vessel 100 is repeated regardless of the up-and-down speed of the hull 101 each time the marine vessel 100 encounters a wave, and thus this is not preferable from the viewpoint of improving the ride comfort.

Therefore, when the up-and-down speed of the hull 101 is equal to or lower than an up-and-down speed threshold (predetermined up-and-down speed), the up-and-down speed block 53 sets the up-and-down speed to zero regardless of the estimation by the Kalman filter 52. Thus, the subtraction throttle opening becomes zero, the upper limit throttle opening is not reduced, and the vessel speed of the marine vessel 100 does not change. Consequently, the repetitive acceleration and deceleration of the marine vessel 100 is reduced or prevented such that the ride comfort is further improved. Furthermore, an unnecessarily reduction in the average vessel speed is reduced or prevented such that a delay in reaching the destination of the marine vessel 100 is prevented.

Figure 4:
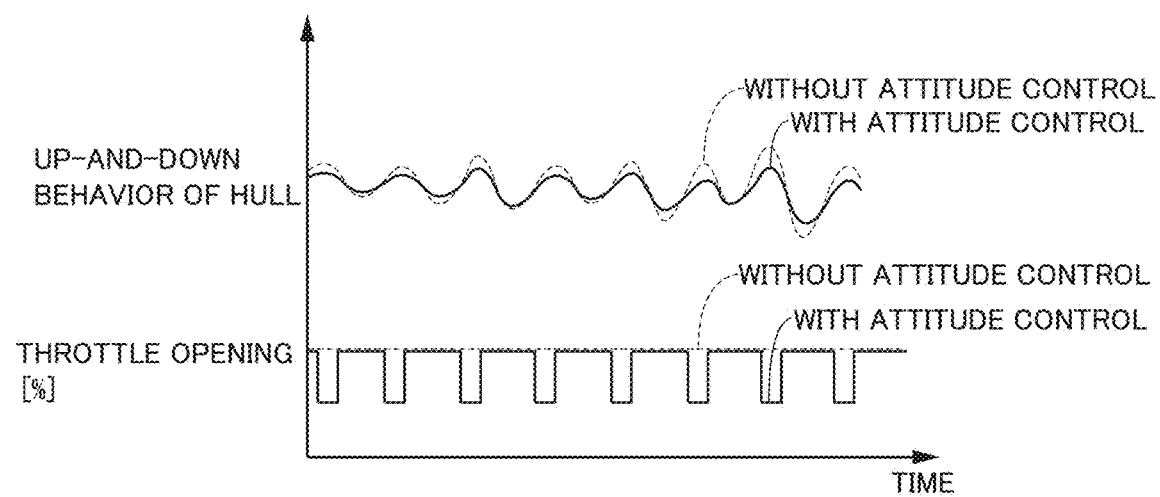
FIG. 4 is a graph showing a relationship between time when an attitude control is performed and both the up-and-down behavior of a hull and a throttle opening.

As shown in FIG. 4, as a result of the attitude control by the controller 4, the throttle opening (vessel speed) temporarily decreases each time the marine vessel 100 rides over a wave. As a result of the attitude control by the controller 4, the up-and-down behavior of the hull 101 is improved.

Figure 5:
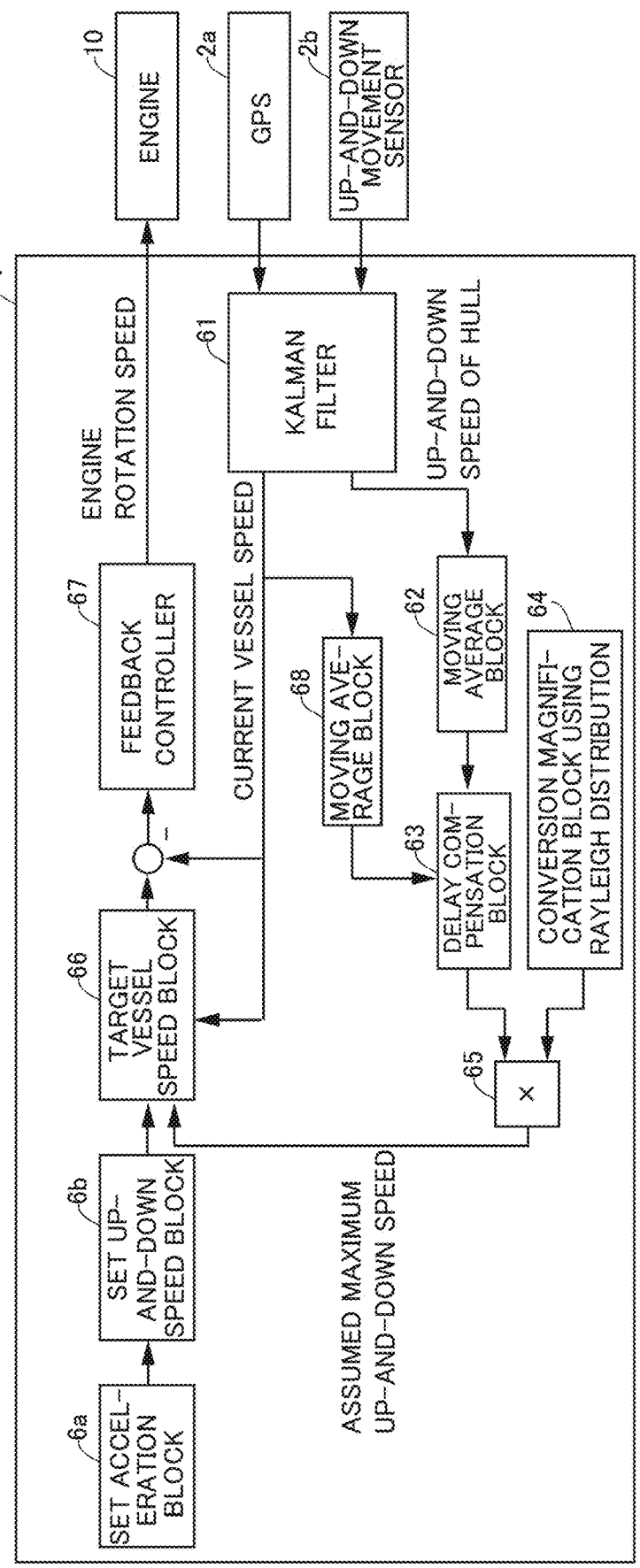
FIG. 5 is a diagram illustrating a control structure for a speed control of a controller.

The control structure of the controller 4 to perform the speed control is described with reference to FIGS. 5 and 6. The controller 4 controls the opening of the throttle valve 10a (hereinafter referred to as a "throttle opening") based on the up-and-down speed of the marine vessel 100.

The controller 4 includes, as the control structure for the speed control, a set acceleration block 6a, a set up-and-down speed block 6b, a Kalman filter 61, a moving average block 62, a delay compensation block 63, a conversion magnification block 64, a multiplier 65, a target vessel speed block 66, a feedback controller 67, and a moving average block 68.

In the speed control, the controller 4 reduces an impact by changing the vessel speed based on a moving average value of the up-and-down speed or the up-and-down acceleration of the hull 101 and an occurrence probability density distribution of a wave height to reduce an up-and-down acceleration and deceleration of the hull 101. The details of the speed control are described below.

First, in the set acceleration block 6a, the up-and-down acceleration (hereinafter referred to as a "set acceleration") of the hull 101 corresponding to an impact input to the hull 101 that may be tolerated by passengers on board is set by the vessel user or the like. Then, this up-and-down acceleration is converted into an up-and-down speed (hereinafter referred to as a "set up-and-down speed") by a predetermined calculation in the set up-and-down speed block 6b.

Next, in the speed control controller, the Kalman filter 61 calculates the real-time up-and-down speed and current vessel speed of the marine vessel 100 based on the measurement results of the current position of the marine vessel 100 and the behavior of the marine vessel 100 transmitted from the GPS 2a and the up-and-down movement sensor 2b. Hereinafter, the former is referred to as an "up-and-down speed of the hull".

The up-and-down speed of the hull varies from moment to moment each time the marine vessel 100 rides over a wave, and thus when the up-and-down speed of the hull is used without any change, the speed control may not converge. Therefore, the up-and-down speed moving average value (first moving average value) obtained by performing a moving average on the up-and-down speed of the hull is used to smooth variations in the up-and-down speed of the hull and converge the speed control. Specifically, the moving average block 62 calculates the up-and-down speed moving average value by performing a moving average on the up-and-down speed of the hull over a predetermined period of time. The variations in the up-and-down speed of the hull are smoothed by the moving average.

The up-and-down speed moving average value causes a time delay with respect to the real-time up-and-down speed of the hull, and thus when the up-and-down speed moving average value is used without any change for the speed control, the control stability may be compromised. Therefore, the delay compensation block 63 calculates a predicted value of the current up-and-down speed moving average value (hereinafter referred to as an "up-and-down speed moving average predicted value") from the up-and-down speed moving average value. Specifically, the time delay of the up-and-down speed moving average value is compensated for by performing, in the moving average block 68, a moving average process on the vessel speed calculated by the Kalman filter 61 to calculate a vessel speed moving average value (second moving average value), and further calculating, in the delay compensation block 63, the up-and-down speed moving average predicted value from the calculated up-and-down speed moving average value or vessel speed moving average value, and the current vessel speed.

When the wave height is constant, the relationship between the up-and-down speed of the hull and the vessel speed is linear. Therefore, the up-and-down speed moving average predicted value is obtained by multiplying the current vessel speed, the vessel speed moving average value, and the reciprocal of the up-and-down speed moving average value.

The up-and-down speed of the hull is used as an index of the impact to the hull 101, and thus it is necessary to obtain the up-and-down speed of the hull at which the impact is expected to be maximum in order to reduce the impact to the hull 101. It has been confirmed that when the vessel speed is constant, the relationship between the up-and-down speed of the hull and the wave height is linear. Therefore, based on a maximum wave height that may occur with a permissible occurrence probability (predetermined probability) (5%, for example) or less, the up-and-down speed of the hull (hereinafter referred to as an "assumed maximum up-and-down speed") corresponding to the maximum wave height is calculated.

A method using a Rayleigh distribution is known as a method for expressing the irregularity of a wave height as a probability distribution (the occurrence probability density distribution of a wave height described above), and the occurrence probability density distribution of a wave height follows a Rayleigh probability density distribution. The Rayleigh probability density distribution is expressed by the following equation (1).

$$p(A) = \frac{A}{\sigma^2} \exp\left(-\frac{A^2}{2\sigma^2}\right) \quad (1)$$

The relationship between an average wave height $H_{ave}$ and the standard deviation $\sigma$ of a wave height in the above equation (1) is expressed by the following equation (2), and thus when the following equation (2) is substituted into the above equation (1), a Rayleigh cumulative distribution function expressed by the following equation (3) is obtained, which indicates the occurrence probability density distribution of a wave height.

$$\sigma = H_{ave}\sqrt{\frac{2}{\pi}} \quad (2)$$

$$F(x) = 1 - e^{\frac{-x^2}{2\sigma^2}} \quad (3)$$

Figure 6:
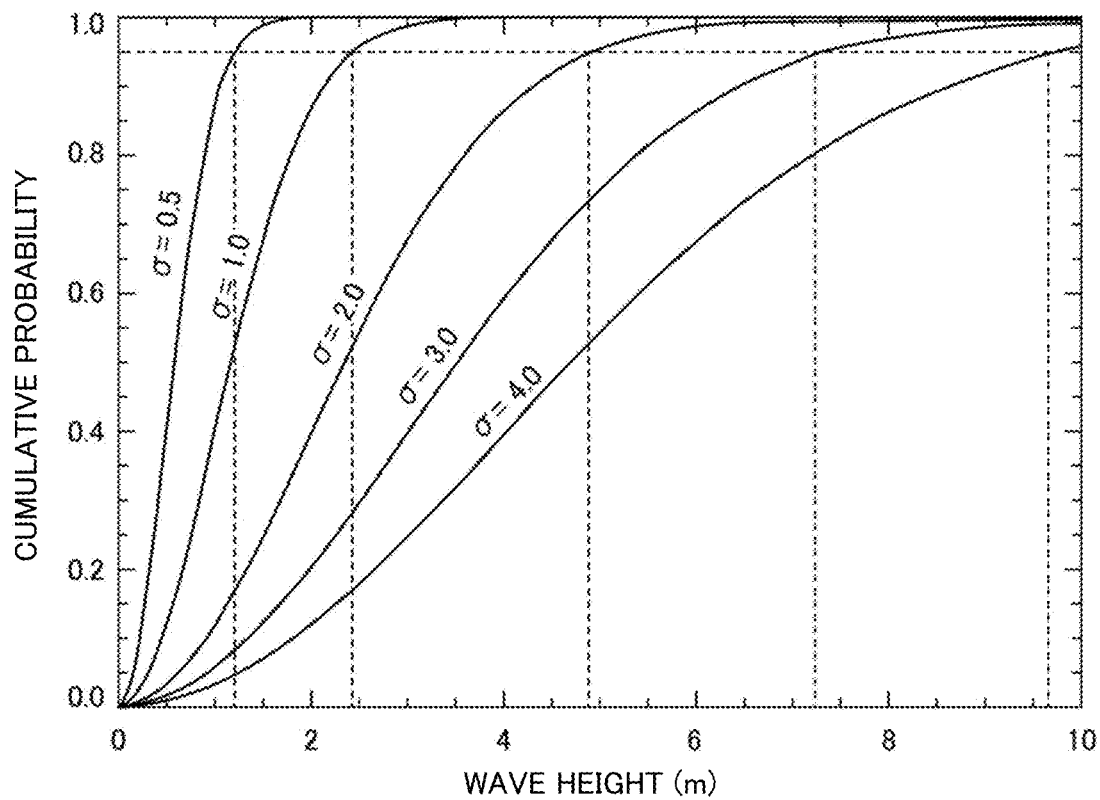
FIG. 6 is a graph showing an occurrence probability density distribution of a wave height.

Each occurrence probability density distribution in FIG. 6 is obtained based on the above equation (3). The horizontal axis of the graph in FIG. 6 indicates a possible wave height, and the vertical axis of the graph indicates the cumulative occurrence probability of a wave height (hereinafter simply referred to as a "cumulative probability"). The maximum wave height (hereinafter referred to as an "assumed maximum wave height") that may occur with a permissible occurrence probability (hereinafter referred to as a "permissible probability") or less is a maximum wave height at the cumulative probability obtained by subtracting the permissible probability from 100% (total occurrence probability) in the occurrence probability density distribution of a wave height. Therefore, in FIG. 6, the assumed maximum wave height at a permissible probability of 5% or less is a maximum wave height at a cumulative probability of 95%, and as shown by broken lines, the assumed maximum wave height is about 1.2 m when the standard deviation $\sigma$ of a wave height is 0.5, the assumed maximum wave height is about 2.4 m when the standard deviation $\sigma$ of a wave height is 1.0, the assumed maximum wave height is about 4.8 m when the standard deviation $\sigma$ of a wave height is 2.0, the assumed maximum wave height is about 7.2 m when the standard deviation $\sigma$ of a wave height is 3.0, and the assumed maximum wave height is about 9.6 m when the standard deviation $\sigma$ of a wave height is 4.0.

As shown by these, the ratio (variation) of the assumed maximum wave height to the standard deviation $\sigma$ of a wave height at a certain permissible probability (hereinafter referred to as a "conversion magnification") is constant regardless of the standard deviation $\sigma$ of a wave height, and for example, in a case in which the permissible probability is set to 5% or less, the conversion magnification is a constant value of 2.4. Furthermore, as shown in the above equation (2), the standard deviation $\sigma$ of a wave height is a surrogate indicator for the average wave height. Therefore, the conversion magnification of the assumed maximum wave height with respect to the average wave height at a certain permissible probability is constant regardless of the average wave height.

As described above, the relationship between the up-and-down speed of the hull and the wave height is linear, and thus the conversion magnification of the assumed maximum up-and-down speed with respect to the up-and-down speed moving average value is the same as the conversion magnification of the assumed maximum wave height with respect to the average wave height at a certain permissible probability. Therefore, in the conversion magnification block 64, the conversion magnification of the assumed maximum wave height with respect to the average wave height at a certain permissible probability is calculated using the Rayleigh probability density distribution, and in the multiplier 65, the assumed maximum up-and-down speed is estimated by multiplying the up-and-down speed moving average predicted value by the conversion magnification. The assumed maximum up-and-down speed to be estimated is a maximum up-and-down speed of the hull that may occur with the permissible probability or less, and is the maximum up-and-down speed of the hull at the cumulative probability obtained by subtracting the permissible probability from 100% (total occurrence probability). The permissible probability is not limited to 5% and may be any value, since it depends on the preferences of the vessel user and/or the passengers on board (how much impact is tolerable).

Next, in the target vessel speed block 66 of the speed control controller, the target vessel speed is calculated based on the assumed maximum up-and-down speed, the set up-and-down speed, and the current vessel speed. The target vessel speed refers to a vessel speed at which the impact input to the hull 101 is maintained at a magnitude that may be tolerated by the passengers on board, and corresponds to the set up-and-down speed. The assumed maximum up-and-down speed is also considered as the maximum up-and-down speed that may be reached when the marine vessel 100 travels at the current vessel speed. Thus, the current vessel speed corresponds to the assumed maximum up-and-down speed. As described above, the relationship between the up-and-down speed of the hull and the vessel speed is linear. Therefore, the ratio of the set up-and-down speed to the assumed maximum up-and-down speed is the same as the ratio of the target vessel speed to the current vessel speed. Based on this idea, in the target vessel speed block 66, the target vessel speed is determined by multiplying the current vessel speed by the ratio of the set up-and-down speed to the assumed maximum up-and-down speed.

Next, in the feedback controller 67 of the speed control controller, a correction amount with respect to the current rotation speed of the engine 10 is determined based on a difference between the target vessel speed and the current vessel speed, and the corrected rotation speed of the engine 10 is transmitted to the propulsion device 1. Thus, a feedback control is performed such that the current vessel speed approaches the target vessel speed. The controller 4 repeats the processes described above to perform the speed control of the marine vessel 100.

Figure 7:
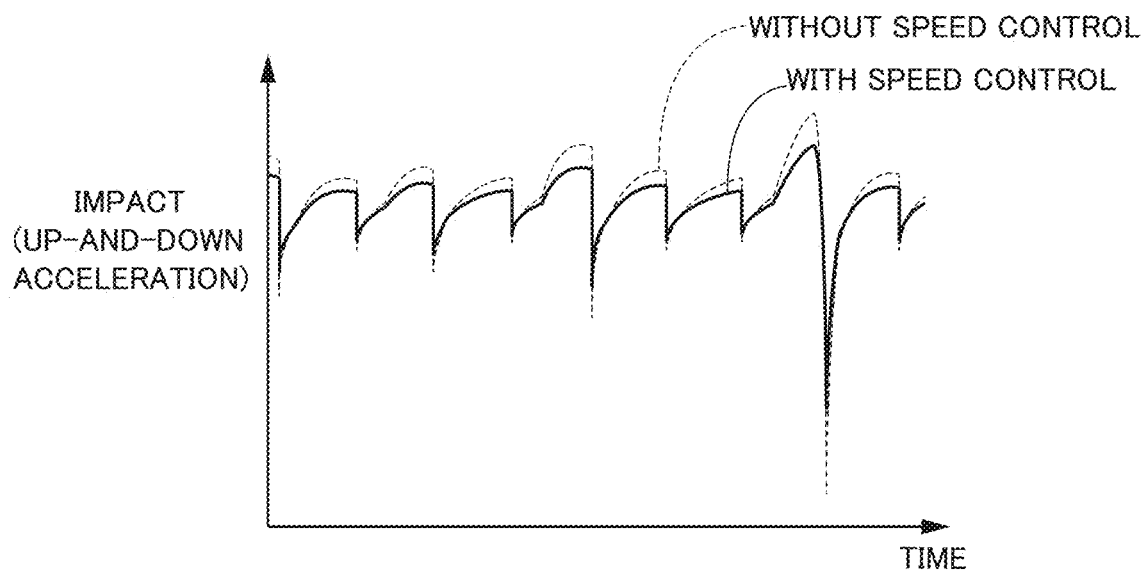
FIG. 7 is a graph showing a relationship between time when a speed control is performed and an up-and-down acceleration of a hull.

As shown in FIG. 7, as a result of the speed control by the controller 4, an impact received by the hull 101 is reduced or prevented.

Figure 8:
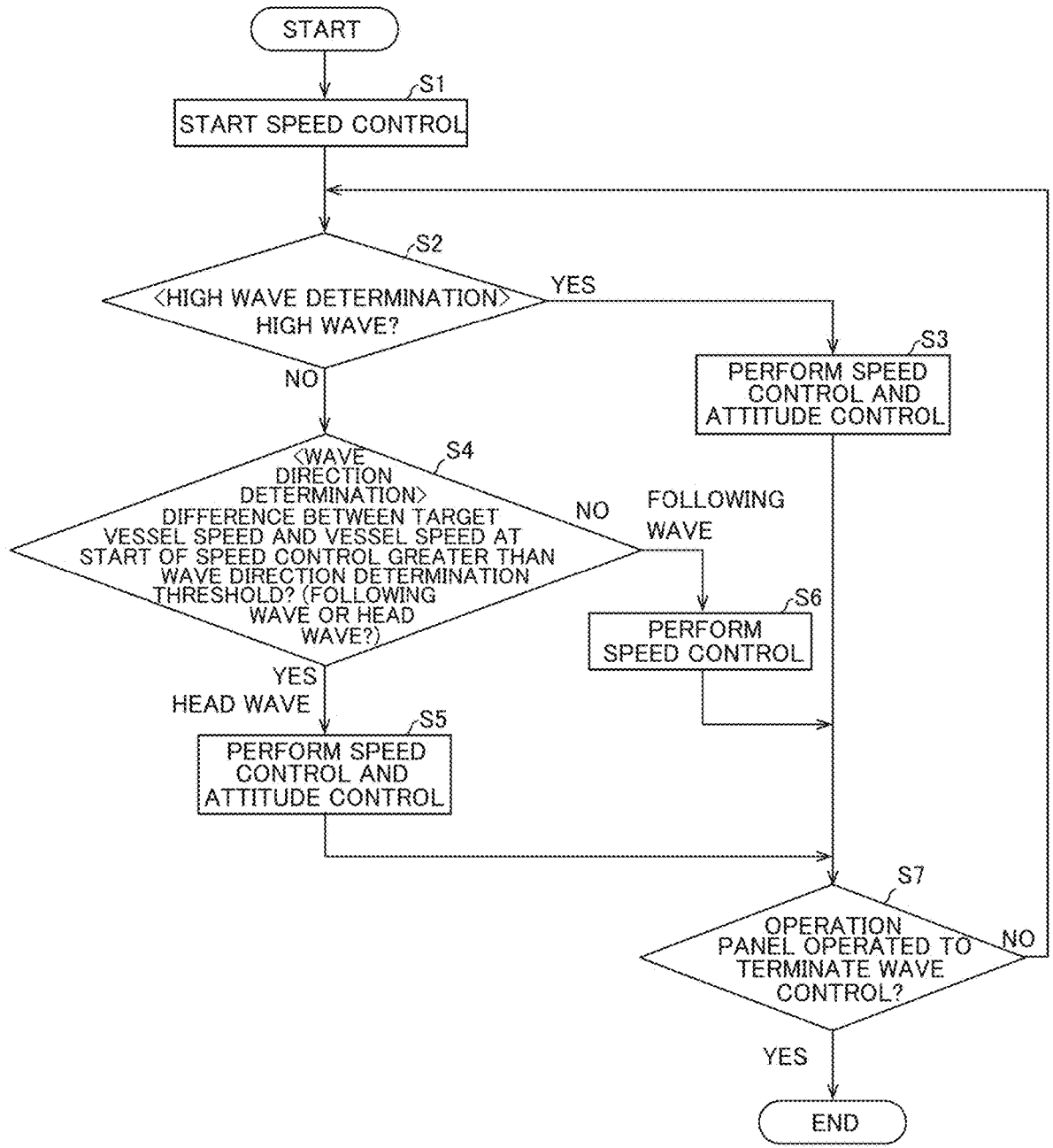
FIG. 8 is a flowchart of a wave control performed by a controller of the marine propulsion system according to the first example embodiment of the present invention.

Referring to FIG. 8, a flow of the wave control including the speed control and the attitude control performed by the controller 4 is now described. As described above, the wave control performed by the controller 4 is started by operating a predetermined switch on the operation panel 3a. The controller 4 uses an operation to start the wave control on the operation panel 3a as a trigger to make a wave direction determination (step S3) to determine whether the wave condition is a head wave or a following wave described below. In the speed control, the controller 4 performs a control to adjust the vessel speed such that the actual vessel speed becomes the target vessel speed, which is a target value of the vessel speed to reduce the up-and-down acceleration and deceleration of the hull 101. The target vessel speed is the vessel speed described above in "the details of the speed control".

The target vessel speed described above includes a limited target vessel speed in which a predetermined limit is placed on the amount of change of the vessel speed such that a difference between the actual vessel speed and the target value of the vessel speed is reduced. For example, when the difference between the target vessel speed obtained by the calculation described above in "the details of the speed control" and the actual vessel speed is larger than a predetermined value (limited target vessel speed), the controller 4 sets the target vessel speed to a predetermined value (limited target vessel speed) rather than the value obtained by the calculation described above in "the details of the speed control".

In the speed control, an upper limit is set for the rate of change of the actual vessel speed toward the target vessel speed. The controller 4 performs a control to increase the upper limit value for the rate of change when the difference between the target vessel speed and the actual vessel speed is equal to or greater than a first threshold. As a specific example, when the first threshold is 5 km/h and the actual vessel speed is 6 km/h, which is greater than the first threshold, the upper limit for the rate of change of the vessel speed per second is set to 2 km/h, and when the first threshold is 5 km/h and the actual vessel speed is 4 km/h, which is less than the first threshold, the upper limit for the rate of change of the vessel speed per second is set to 0.2 km/h.

In step S1, the controller 4 performs the speed control. This speed control is continuously performed from the start to the end of the wave control. That is, the controller 4 performs the speed control regardless of whether the result of the wave direction determination described below is a head wave or a following wave. Then, the process advances to step S2.

In step S2, the controller 4 determines whether or not high waves are occurring. Specifically, in step S2, in the wave control, the controller 4 makes a high wave determination to determine whether or not the up-and-down speed or the up-and-down acceleration of the hull 101 is equal to or higher than a predetermined high wave determination threshold based on the measurement results of the up-and-down movement sensor 2b when waves are occurring. When it is determined that the up-and-down speed or the up-and-down acceleration of the hull 101 is equal to or higher than the high wave determination threshold, the process advances to step S3, and when it is determined that the up-and-down speed or the up-and-down acceleration of the hull 101 is less than the high wave determination threshold, the process advances to step S4.

In step S3, the controller 4 performs the attitude control in addition to the speed control. Specifically, when it is determined that the up-and-down speed or the up-and-down acceleration of the hull 101 is equal to or higher than the high wave determination threshold in the high wave determination, the controller 4 performs the attitude control regardless of the result of the wave direction determination. Then, the process advances to step S7.

In step S4, in the wave control, the controller 4 makes the wave direction determination to determine whether the wave condition relative to the hull 101 is a head wave or a following wave based on at least the measurement results of the up-and-down movement sensor 2b. At this time, the controller 4 makes the wave direction determination based on at least the target vessel speed, which is the target value of the vessel speed to reduce the up-and-down acceleration and deceleration of the hull 101 in the speed control. The target vessel speed is acquired based on the measurement results of the up-and-down movement sensor 2b. The target vessel speed is acquired from a calculation performed by the controller, which is (average vessel speed)×($\sqrt{\phantom{x}}$ the allowable value of the ascent speed of the hull)×($\sqrt{\phantom{x}}$ the average value of the ascent speed of the hull obtained from the measurement values of the up-and-down movement sensor 2b), for example. The "allowable value of the ascent speed of the hull" refers to a predetermined value determined in advance for the "average value of the ascent speed of the hull obtained from the measurement values of the up-and-down movement sensor 2b", for example. As another method for acquiring the target vessel speed, the controller acquires the target vessel speed using a PID control to perform a feedback control by multiplying a predetermined gain by a difference between the "allowable value of the ascent speed of the hull" and the "average value of the ascent speed of the hull obtained from the measurement values of the up-and-down movement sensor 2b".

More specifically, in step S4, the controller 4 determines whether or not a determination vessel speed difference, which is a difference between the target vessel speed and the vessel speed at the start of the speed control, is greater than a predetermined wave direction determination threshold in the wave direction determination.

When it is determined that the determination vessel speed difference is equal to or less than the wave direction determination threshold, the current wave condition is determined to be a following wave and the process advances to step S6. When it is determined that the determination vessel speed difference is greater than the wave direction determination threshold, the current wave condition is determined to be a head wave and the process advances to step S5.

In step S4, the controller 4 corrects the target vessel speed based on a hull structure including a hull weight and a hull shape when acquiring the determination vessel speed difference, which is the difference between the target vessel speed and the vessel speed at the start of the speed control. Specifically, in step S4, the controller 4 acquires a corrected target vessel speed by multiplying the target vessel speed by a predetermined correction coefficient set based on the hull structure including the hull weight and the hull shape when acquiring the determination vessel speed difference, which is the difference between the target vessel speed and the vessel speed at the start of the speed control. Then, the controller 4 acquires the determination vessel speed difference based on the corrected target vessel speed.

In step S5, the controller 4 performs the attitude control in addition to the speed control. Then, the process advances to step S7.

In step S6, the controller 4 continues to perform the speed control and does not perform the attitude control. Then, the process advances to step S7.

As described in step S4 to step S6, in the wave direction determination, the controller 4 determines that the wave condition is a head wave and performs the attitude control when it is determined that the determination vessel speed difference, which is the difference between the target vessel speed and the vessel speed at the start of the speed control, is greater than the predetermined wave direction determination threshold, and determines that the wave condition is a following wave and does not perform the attitude control when it is determined that the determination vessel speed difference is equal to or less than the wave direction determination threshold.

In step S7, the controller 4 determines whether or not the operation panel 3a has been operated to terminate the wave control. When the operation panel 3a has been operated to terminate the wave control, the wave control is terminated. When the operation panel 3a has not been operated to terminate the wave control, the process returns to step S2.

According to the first example embodiment of the present invention, the following advantageous effects are achieved.

According to the first example embodiment of the present invention, the marine propulsion system 102 includes the controller 4 configured or programmed to perform the wave control including the attitude control to reduce an up-and-down attitude change of the hull 101 by temporarily reducing the vessel speed based on the measurement results of the up-and-down movement sensor 2b each time the marine vessel 100 rides over a wave when waves are occurring, and the controller 4 is configured or programmed to, in the wave control, make the wave direction determination to determine whether the wave condition relative to the hull 101 is a head wave or a following wave based on at least the measurement results of the up-and-down movement sensor 2b, perform the attitude control when it is determined that the wave condition is a head wave in the wave direction determination, and not perform the attitude control when it is determined that the wave condition is a following wave in the wave direction determination. Accordingly, a distinction is made between a following wave and a head wave, and the hull 101 is stabilized by temporarily reducing the vessel speed each time the marine vessel 100 rides over a wave when head waves that tend to cause a large impact on the hull 101 are occurring. Furthermore, when following waves are occurring in which the hull 101 tends to become unstable when the vessel speed is reduced, the vessel speed is prevented from being temporarily reduced each time the marine vessel 100 rides over a wave. Therefore, a control is performed according to the direction of the waves, taking into account the direction of the waves not conventionally taken into account, and thus when waves are occurring, the stability of the hull 101 is improved to improve the ride comfort. Furthermore, the attitude control allows the vessel speed to be temporarily reduced each time the marine vessel 100 rides over a wave when head waves are occurring, and thus the possibility that the marine vessel 100 rides over a wave with great force is reduced or prevented, for example.

According to the first example embodiment of the present invention, the wave control includes the speed control to adjust the vessel speed to the target vessel speed, which is the target value of the vessel speed, and the controller 4 is configured or programmed to perform the speed control regardless of a head wave or a following wave. Accordingly, the attitude control is performed in a case of a head wave, and the speed control is performed regardless of a head wave or a following wave such that the speed is reduced when waves are occurring. Thus, when waves are occurring, the stability of the hull 101 is further improved to further improve the ride comfort.

According to the first example embodiment of the present invention, the speed control includes a control to adjust the vessel speed to reduce an impact when the marine vessel 100 rides over a wave, and the controller 4 is configured or programmed to perform the speed control regardless of whether the result of the wave direction determination is a head wave or a following wave. Accordingly, the attitude control is performed in a case of a head wave, and the speed control is performed regardless of a head wave or a following wave such that the impact is further reduced. Consequently, when waves are occurring, the stability of the hull 101 is further improved to further improve the ride comfort.

According to the first example embodiment of the present invention, the controller 4 is configured or programmed to make the wave direction determination based on at least the target vessel speed to reduce the up-and-down acceleration and deceleration of the hull in the speed control. Accordingly, the wave direction determination is made based on the target vessel speed, which is the target value of the vessel speed to reduce the up-and-down acceleration and deceleration of the hull 101, and thus the up-and-down acceleration and deceleration of the hull 101 is effectively reduced.

According to the first example embodiment of the present invention, the target vessel speed includes the limited target vessel speed in which the predetermined limit is placed on the amount of change of the vessel speed such that the difference between the actual vessel speed and the target value of the vessel speed is reduced. Accordingly, due to the limited target vessel speed in which the predetermined limit is placed on the amount of change of the vessel speed, sudden acceleration and deceleration of the marine vessel is reduced or prevented.

According to the first example embodiment of the present invention, the controller 4 is configured or programmed to, in the wave direction determination, determine that the wave condition is a head wave and perform the attitude control when it is determined that the determination vessel speed difference, which is the difference between the target vessel speed and the vessel speed at the start of the speed control, is greater than the predetermined wave direction determination threshold, and determine that the wave condition is a following wave and not perform the attitude control when it is determined that the determination vessel speed difference is equal to or less than the wave direction determination threshold. Accordingly, it is appropriately determined whether the wave condition is the head wave that causes the vessel speed at the start of the speed control to be unlikely to reach the target vessel speed or the following wave that causes the vessel speed at the start of the speed control to be likely to reach the target vessel speed.

According to the first example embodiment of the present invention, in the speed control, an upper limit is set on the rate of change of the actual vessel speed toward the target vessel speed, and the controller 4 is configured or programmed to perform a control to increase the upper limit for the rate of change when the difference between the target vessel speed and the actual vessel speed is equal to or greater than the first threshold. Accordingly, the vessel speed quickly follows the target vessel speed according to the wave condition.

According to the first example embodiment of the present invention, the controller 4 is configured or programmed to, in the speed control, adjust the vessel speed based on the moving average value of the up-and-down speed or the up-and-down acceleration of the hull 101 to reduce an impact when the marine vessel 100 rides over a wave, and set the target vessel speed based on the moving average value when making the wave direction determination. Accordingly, the moving average value of the up-and-down speed or the up-and-down acceleration of the hull 101 is considered in the speed control, and thus the influence of an instantaneous change or a change in a relatively short period of time in the up-and-down speed or the up-and-down acceleration of the hull 101 on the wave direction determination in the speed control is reduced or prevented.

According to the first example embodiment of the present invention, the propulsion device 1 includes the engine 10 as a drive source to generate a thrust, and the controller 4 is configured or programmed to perform the attitude control by reducing the output of the engine 10 to reduce the vessel speed. Accordingly, the attitude control is easily performed by adjusting the output of the engine 10 to reduce the vessel speed.

According to the first example embodiment of the present invention, the controller 4 is configured or programmed to, in the wave control, make the high wave determination to determine whether or not the up-and-down speed or the up-and-down acceleration of the hull 101 is equal to or higher than the predetermined high wave determination threshold based on the measurement results of the up-and-down movement sensor 2b when waves are occurring, and perform the attitude control regardless of the result of the wave direction determination when it is determined that the up-and-down speed or the up-and-down acceleration of the hull 101 is equal to or higher than the high wave determination threshold in the high wave determination. Accordingly, in a case of a high wave in which the hull 101 is likely to become unstable, the attitude control is reliably performed regardless of a following wave or a head wave.

According to the first example embodiment of the present invention, the marine propulsion system 102 further includes the operation panel 3a to receive an operation to start the wave control and an operation to terminate the wave control, and the controller 4 is configured or programmed to make the wave direction determination to determine whether the wave condition is a head wave or a following wave, using the operation to start the wave control on the operation panel 3a as a trigger. Accordingly, the operation panel 3a allows the wave control to be easily started and terminated.

According to the first example embodiment of the present invention, the propulsion device 1 includes the engine 10 including the throttle valve 10a, and the controller 4 is configured or programmed to, in the attitude control, perform a subtraction process to reduce the opening of the throttle valve 10a based on the up-and-down speed of the hull 101, and reduce an up-and-down attitude change of the hull 101. Accordingly, the opening of the throttle valve 10a of the engine propulsion device 1 is reduced in the attitude control such that the stability of the hull 101 is improved to improve the ride comfort when waves are occurring.

According to the first example embodiment of the present invention, the controller 4 is configured or programmed to, in the speed control, reduce an impact by changing the vessel speed based on the moving average value of the up-and-down speed or the up-and-down acceleration of the hull 101 and the occurrence probability density distribution of a wave height to reduce the up-and-down acceleration and deceleration of the hull 101. Accordingly, the moving average value of the up-and-down speed or the up-and-down acceleration of the hull 101 is considered in the speed control, and thus the influence of an instantaneous change or a change in a relatively short period of time in the up-and-down speed or the up-and-down acceleration of the hull 101 on the wave direction determination is reduced or prevented. Furthermore, the amount of reduction in the up-and-down acceleration and deceleration of the hull 101 is accurately determined by changing the vessel speed in consideration of the occurrence probability density distribution of a wave height.

Second Example Embodiment

Figure 9:
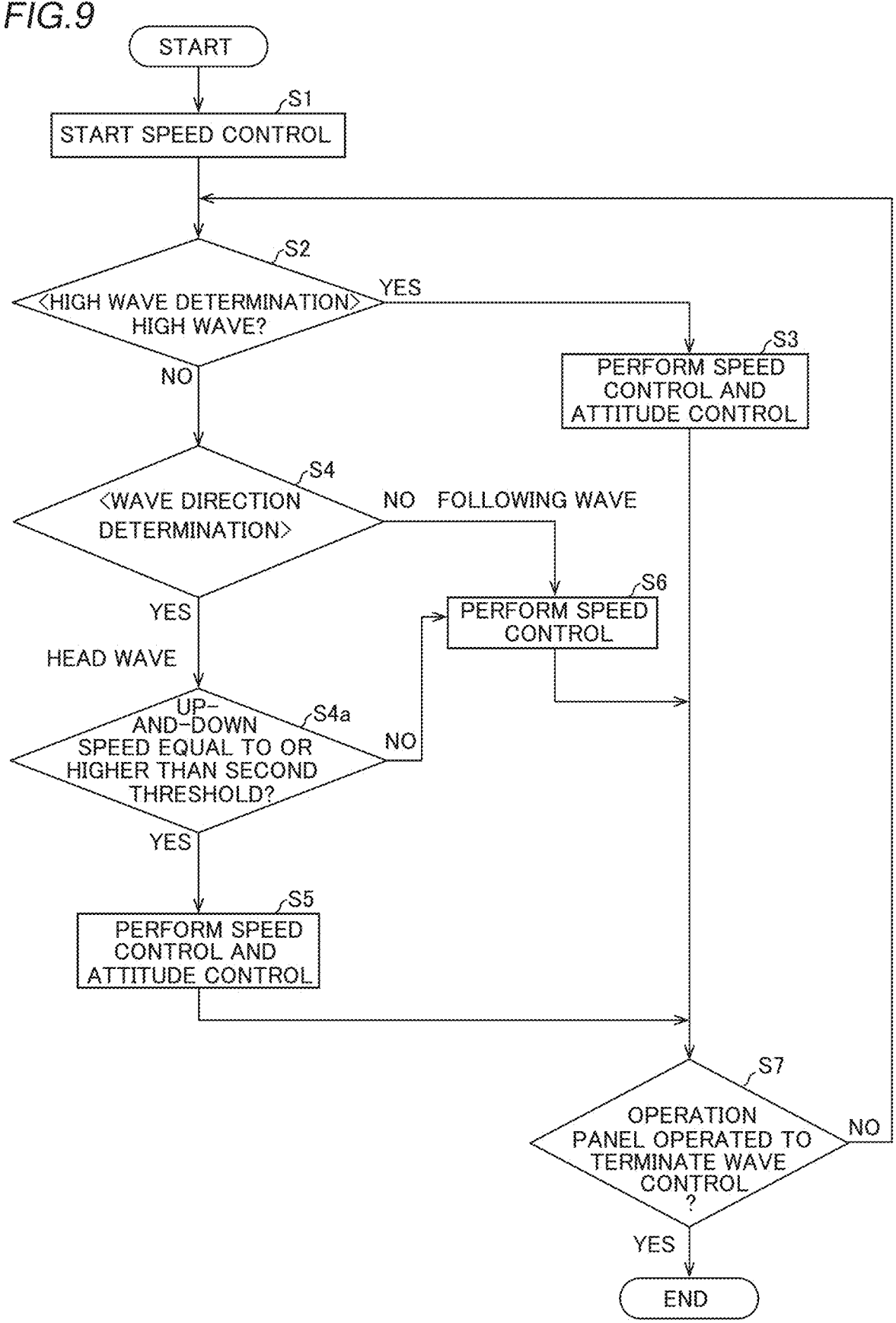
FIG. 9 is a flowchart of a wave control performed by a controller of the marine propulsion system according to the second example embodiment of the present invention.

A marine propulsion system 202 according to a second example embodiment is now described with reference to FIGS. 1 and 9. In the second example embodiment, when it is determined that a wave condition is a head wave in a wave direction determination of a wave control flow, there are a case in which both a speed control and an attitude control are performed and a case in which only the speed control is performed as a result of making a determination in step S4a shown in FIG. 9, which is described below, unlike the first example embodiment in which both the speed control and the attitude control are always performed when it is determined that the wave condition is a head wave in the wave direction determination of the wave control flow. In the second example embodiment, the same or similar structures as those of the first example embodiment are denoted by the same reference numerals, and description thereof is omitted.

The marine propulsion system 202 according to the second example embodiment includes a controller 204.

A flow of the wave control including the speed control and the attitude control performed by the controller 204 is now described. Steps other than step S4a are the same as or similar to those in the first example embodiment, and thus description thereof is omitted.

When it is determined that the wave condition is a head wave in step S4, the process advances to step S4a. In step S4a, in the wave control, the controller 204 determines whether or not an up-and-down speed of a hull 101 is equal to or higher than a second threshold based on the measurement results of an up-and-down movement sensor 2b when waves are occurring. The second threshold is smaller than a high wave determination threshold used in the high wave determination in step S4. When the up-and-down speed of the hull 101 is equal to or higher than the second threshold, the process advances to step S5, and when the up-and-down speed of the hull 101 is less than the second threshold, the process advances to step S6. In short, in step S4a, the controller 204 advances to step S5 and performs a control to start the attitude control in addition to the speed control when the up-and-down speed is equal to or higher than the second threshold while the speed control is being performed and the attitude control is not being performed even when the controller 204 determines that the wave direction is a head wave in the wave direction determination, and advances to step S6 and performs only the speed control when the up-and-down speed is lower than the second threshold.

That is, the controller 204 determines in step S4 that the wave condition is a head wave, and then distinguishes between a state in which waves are relatively rough and a state in which waves are relatively calm in step S4a. When the waves are relatively large and relatively rough, the process advances to step S5, and when the waves are relatively small and relatively calm, the process advances to step S6. The remaining structures of the second example embodiment are similar to those of the first example embodiment.

According to the second example embodiment of the present invention, the following advantageous effects are achieved.

According to the second example embodiment of the present invention, the marine propulsion system 202 includes the controller 204 configured or programmed to perform the wave control including the attitude control to reduce an up-and-down attitude change of the hull 101 by temporarily reducing a vessel speed based on the measurement results of the up-and-down movement sensor 2*b* each time a marine vessel 100 rides over a wave when waves are occurring, and the controller 204 is configured or programmed to, in the wave control, make the wave direction determination to determine whether the wave condition relative to the hull 101 is a head wave or a following wave based on at least the measurement results of the up-and-down movement sensor 2*b*, perform the attitude control when it is determined that the wave condition is a head wave in the wave direction determination, and not perform the attitude control when it is determined that the wave condition is a following wave in the wave direction determination. Accordingly, similarly to the first example embodiment, when waves are occurring, the stability of the hull 101 is improved to improve the ride comfort. Furthermore, the attitude control allows the vessel speed to be temporarily reduced each time the marine vessel 100 rides over a wave when head waves are occurring, and thus the possibility that the marine vessel 100 rides over a wave with great force is reduced or prevented, for example.

According to the second example embodiment of the present invention, the controller 204 is configured or programmed to perform the attitude control in addition to the speed control when it is determined that the up-and-down speed or the up-and-down acceleration of the hull 101 is equal to or higher than the second threshold based on the measurement results of the up-and-down movement sensor 2*b* while the speed control is being performed and the attitude control is not being performed even when the controller 204 determines that the wave direction is a head wave in the wave direction determination. Accordingly, as compared with a case in which only the speed control is performed, rapid deceleration and a decrease in an average speed are reduced when both the speed control and the attitude control are performed. Furthermore, the marine vessel 100 rides over a small wave using only the speed control without the attitude control, and thus a speed change is further reduced to improve the stability of the hull 101. For a large wave at the second threshold or higher, both the attitude control and the speed control are performed, and thus as compared with a case in which only the speed control is performed, the hull 101 is prevented from taking off from the water such that an impact and an attitude change after riding over a wave are reduced.

Third Example Embodiment

Figure 10:
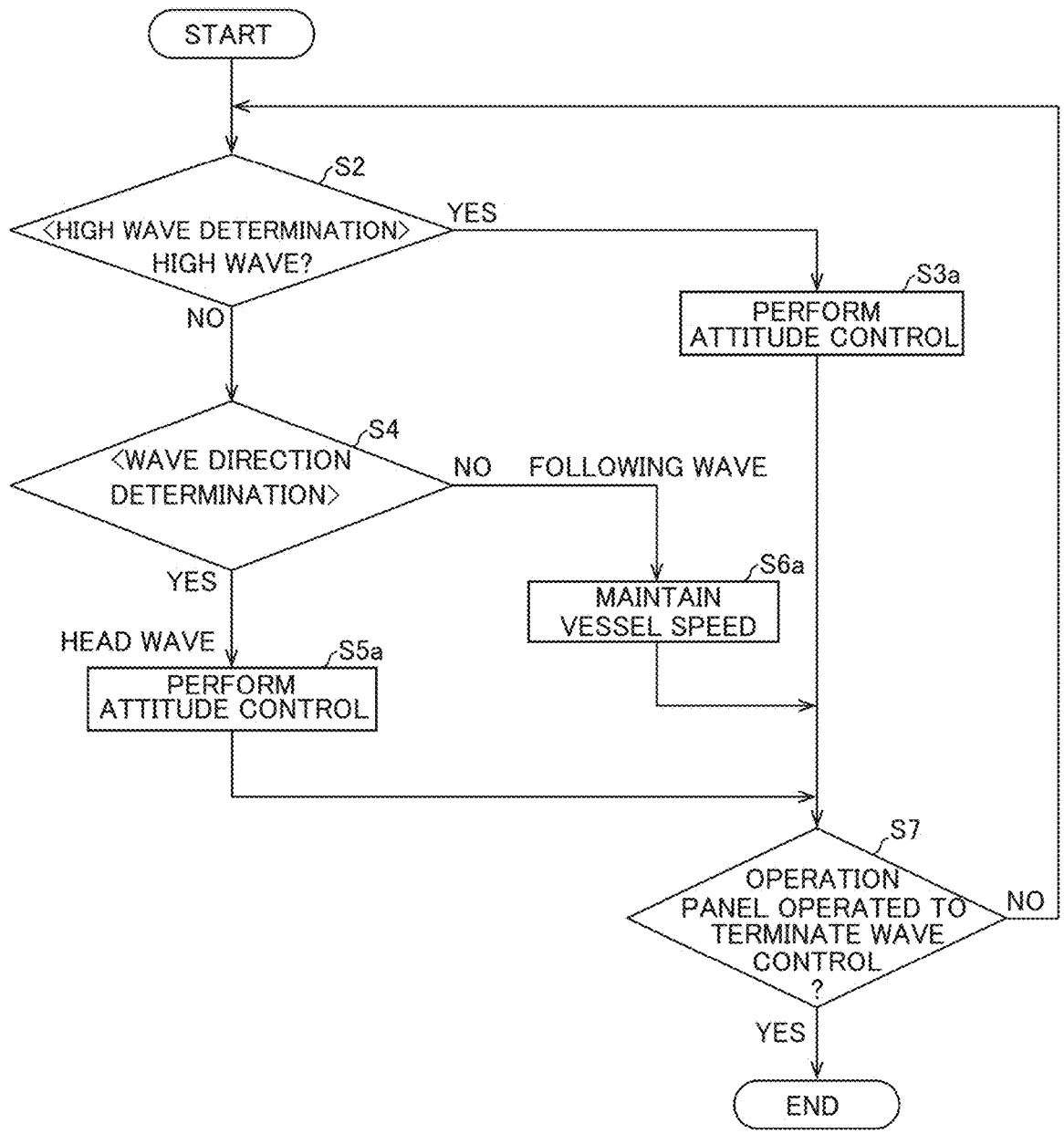
FIG. 10 is a flowchart of a wave control performed by a controller of the marine propulsion system according to the third example embodiment of the present invention.

A marine propulsion system 302 according to a third example embodiment is now described with reference to FIGS. 1 and 10. In the third example embodiment, a controller 304 performs a speed control to maintain a vessel speed without changing a target vessel speed, unlike the first example embodiment in which the controller 4 performs the speed control to change the target vessel speed. In the third example embodiment, the same or similar structures as those of the first example embodiment are denoted by the same reference numerals, and description thereof is omitted.

The marine propulsion system 302 according to the third example embodiment includes a controller 304. The controller 304 performs the speed control to maintain the vessel speed without changing the target vessel speed.

A flow of a wave control including an attitude control performed by the controller 304 is now described. Unlike the first example embodiment, the controller 304 performs a high wave determination in step S2 without starting the speed control to change the target vessel speed at the same time as the start of the wave control. As a result of the high wave determination, when it is determined that a wave condition is a high wave, the process advances to step S3*a*, and the attitude control is performed.

In step S4, the controller 304 determines whether or not a determination vessel speed difference, which is a difference between the target vessel speed to reduce an up-and-down acceleration and deceleration of a hull 101 described in the first example embodiment and the vessel speed at the start of the control, is greater than a predetermined wave direction determination threshold in a wave direction determination. When it is determined that the determination vessel speed difference is equal to or less than the wave direction determination threshold, it is determined that the current wave condition is a following wave, and the process advances to step S6*a*, and when it is determined that the determination vessel speed difference is greater than the wave direction determination threshold, it is determined that the current wave condition is a head wave, and the process advances to step S5*a*. The "vessel speed at the start of the control" described above refers to a vessel speed at the start of the flow shown in FIG. 10.

When it is determined that the wave condition is a head wave as a result of the wave direction determination in step S4, the process advances to step S5*a*. Then, in step S5*a*, the controller 304 performs the attitude control. Then, the process advances to step S7.

When it is determined that the wave condition is a following wave as a result of the wave direction determination in step S4, the process advances to step S6*a*. In step S6*a*, the controller 304 performs a control to maintain the vessel speed. Then, the process advances to step S7. The remaining structures of the third example embodiment are similar to those of the first example embodiment.

In the third example embodiment, similarly to the first example embodiment, the controller 304 makes the determination in step S4 using the target vessel speed described in "the details of the speed control" according to the first example embodiment, but does not perform the speed control to change the target vessel speed. That is, in the third example embodiment, the controller 304 performs a control to acquire the target vessel speed, but does not actually perform the speed control to change the target vessel speed using the target vessel speed. The same applies to a fourth example embodiment described below.

According to the third example embodiment of the present invention, the following advantageous effects are achieved.

According to the third example embodiment of the present invention, the marine propulsion system 302 includes the controller 304 configured or programmed to perform the wave control including the attitude control to reduce an up-and-down attitude change of the hull 101 by temporarily reducing the vessel speed based on the measurement results of an up-and-down movement sensor 2*b* each time a marine vessel 100 rides over a wave when waves are occurring, and the controller 304 is configured or programmed to, in the wave control, make the wave direction determination to determine whether the wave condition relative to the hull 101 is a head wave or a following wave based on at least the measurement results of the up-and-down movement sensor 2*b*, perform the attitude control when it is determined that the wave condition is a head wave in the wave direction determination, and not perform the attitude control when it is determined that the wave condition is a following wave in the wave direction determination. Accordingly, similarly to the first example embodiment, when waves are occurring, the stability of the hull 101 is improved to improve the ride comfort. Furthermore, the attitude control allows the vessel speed to be temporarily reduced each time the marine vessel 100 rides over a wave when head waves are occurring, and thus the possibility that the marine vessel 100 rides over a wave with great force is reduced or prevented, for example.

According to the third example embodiment of the present invention, the controller 304 is configured or programmed to maintain the vessel speed without performing the attitude control when it is determined that the wave condition is a following wave in the wave direction determination. Accordingly, the vessel speed is maintained in a case of a following wave, and thus the instability of the hull 101 due to a decrease in the vessel speed in a case of a following wave is reduced or prevented.

Fourth Example Embodiment

Figure 11:
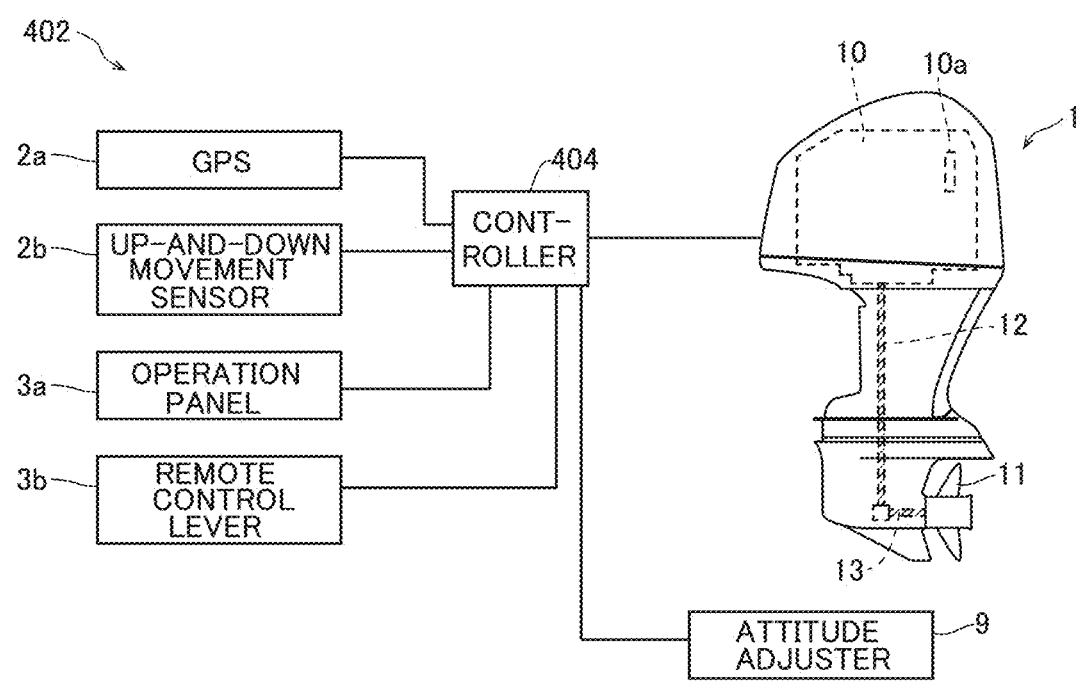
FIG. 11 is a block diagram of the marine propulsion system according to the fourth example embodiment of the present invention.
Figure 12:
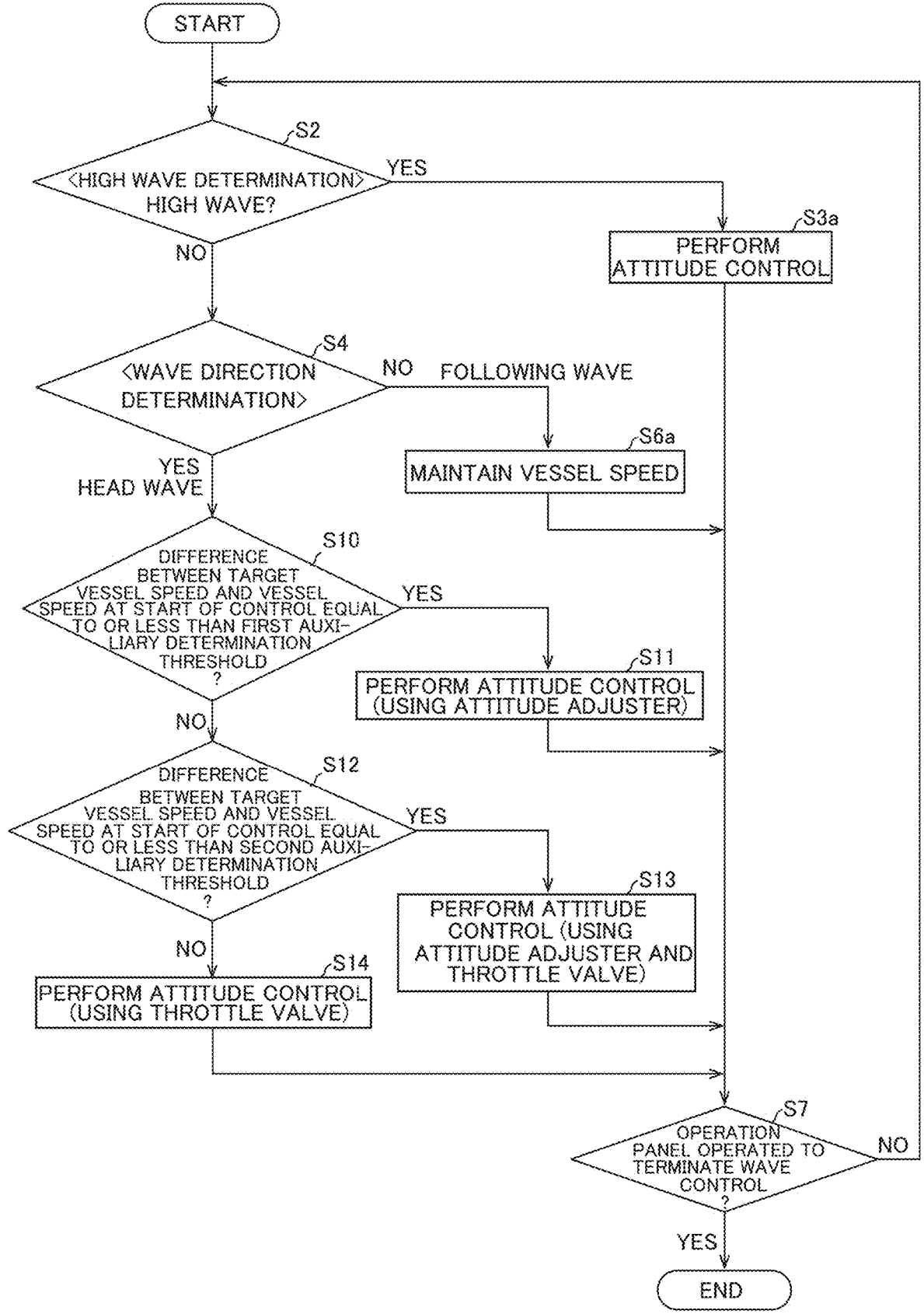
FIG. 12 is a flowchart of a wave control performed by a controller of the marine propulsion system according to the fourth example embodiment of the present invention.

A marine propulsion system 402 according to a fourth example embodiment is now described with reference to FIGS. 1, 11, and 12. In the fourth example embodiment, an attitude control using an attitude adjuster 9 (such as a trim tab) is performed in addition to an attitude control using a throttle valve 10*a*, unlike the third example embodiment in which the controller 304 performs only the attitude control using the throttle valve 10*a* when it is determined that the wave condition is a head wave.

The marine propulsion system 402 according to the fourth example embodiment includes the attitude adjuster 9 and a controller 404. In the fourth example embodiment, an example is described in which the attitude adjuster 9 includes a trim tab.

The attitude adjuster 9 is provided in a hull 101 and adjusts the pitch of the hull 101 by changing its position with respect to the hull 101 (the orientation of a flap of the trim tab) to resist a water flow. The attitude adjuster 9 also adjusts the roll of the hull 101.

The controller 404 according to the fourth example embodiment performs the attitude control to adjust the attitude of the hull 101 by varying the pitch of the hull 101 using the attitude adjuster 9 (such as a trim tab) when waves are occurring. When it is determined to perform the attitude control, the controller 404 switches between performing the attitude control using only the attitude adjuster 9, performing the attitude control using both the attitude adjuster 9 and the throttle valve 10*a*, and performing the attitude control using only the throttle valve 10*a* depending on a wave condition.

A flow of a wave control including the attitude control performed by the controller 404 is now described. The flow according to the fourth example embodiment is different from the flow according to the third example embodiment in steps after the wave direction determination in step S4 when it is determined that the wave condition is a head wave (except for step S7).

When it is determined that the wave condition is a head wave in the wave direction determination in step S4, the process advances to step S10.

When the controller 404 determines in step S10 that a determination vessel speed difference is equal to or less than a first auxiliary determination threshold, the process advances to step S11, and when the controller 404 determines in step S10 that the determination vessel speed difference is greater than the first auxiliary determination threshold, the process advances to step S12. The first auxiliary determination threshold in step S10 is larger than the wave direction determination threshold in step S4.

When the controller 404 determines in step S10 that the determination vessel speed difference is greater than the first auxiliary determination threshold, the process advances to step S12, and when the controller 404 determines in step S10 that the determination vessel speed difference is equal to or less than the first auxiliary determination threshold, the process advances to step S11. A case in which the process advances to step S11 refers to a condition in which waves are relatively calm (a condition in which waves are slightly choppy due to wind), and a case in which the process advances to step S12 refers to a condition in which waves are rolling and relatively rough (choppy due to wind) as compared with a case in which the process advances to step S11.

In step S11, the attitude control is performed using only the attitude adjuster 9 (such as a trim tab). As a result of the attitude control using only the attitude adjuster 9 (such as a trim tab), the attitude of the hull 101 is adjusted by changing the pitch and roll without reducing a speed (much). Then, the process advances to step S7.

When the controller 404 determines in step S12 that the determination vessel speed difference is equal to or less than a second auxiliary determination threshold, the process advances to step S13, and when the controller 404 determines in step S12 that the determination vessel speed difference is greater than the second auxiliary determination threshold, the process advances to step S14. The second auxiliary determination threshold in step S12 is larger than the first auxiliary determination threshold in step S10.

In step S13, the attitude control is performed using both the attitude adjuster 9 (such as a trim tab) and the throttle valve 10*a*. Then, the process advances to step S7.

In step S14, the attitude control is performed using only the throttle valve 10*a*. Then, the process advances to step S7.

According to the fourth example embodiment of the present invention, the following advantageous effects are achieved.

According to the fourth example embodiment of the present invention, the marine propulsion system 402 includes the controller 404 configured or programmed to perform the wave control including the attitude control to reduce an up-and-down attitude change of the hull 101 by temporarily reducing a vessel speed based on the measurement results of an up-and-down movement sensor 2*b* each time a marine vessel 100 rides over a wave when waves are occurring, and the controller 404 is configured or programmed to, in the wave control, make the wave direction determination to determine whether the wave condition relative to the hull 101 is a head wave or a following wave based on at least the measurement results of the up-and-down movement sensor 2*b*, perform the attitude control when it is determined that the wave condition is a head wave in the wave direction determination, and not perform the attitude control when it is determined that the wave condition is a following wave in the wave direction determination. Accordingly, similarly to the first example embodiment, when waves are occurring, the stability of the hull 101 is improved to improve the ride comfort. Furthermore, the attitude control allows the vessel speed to be temporarily reduced each time the marine vessel 100 rides over a wave when head waves are occurring, and thus the possibility that the marine vessel 100 rides over a wave with great force is reduced or prevented, for example.

According to the fourth example embodiment of the present invention, the marine propulsion system 402 further includes the attitude adjuster 9 in the hull 101 to adjust the pitch of the hull 101 by changing the position of the attitude adjuster 9 with respect to the hull 101 (the orientation of the flap of the trim tab) to resist a water flow, and the controller 404 is configured or programmed to perform the attitude control to adjust the attitude of the hull 101 by varying the pitch of the hull 101 using the attitude adjuster 9 when waves are occurring. Accordingly, as compared with a case in which the throttle valve is adjusted in the attitude control, the hull 101 is stabilized while the attitude adjuster 9 is adjusted to reduce or prevent a decrease in the vessel speed.

The example embodiments of the present invention described above are illustrative in all points and not restrictive. The extent of the present invention is not defined by the above description of the example embodiments but by the scope of the claims, and all modifications within the meaning and range equivalent to the scope of the claims are further included.

For example, while the propulsion device preferably includes an outboard motor in each of the first to fourth example embodiments described above, the present invention is not restricted to this. In an example embodiment of the present invention, the propulsion device may alternatively include an inboard motor or an inboard-outboard motor, for example.

While the operator preferably includes an operation panel in each of the first to fourth example embodiments described above, the present invention is not restricted to this. In an example embodiment of the present invention, the operator may alternatively include a touch panel, for example.

While the attitude adjuster preferably includes a trim tab in the fourth example embodiment described above, the present invention is not restricted to this. In an example embodiment of the present invention, the attitude adjuster may alternatively an interceptor, for example.

While two auxiliary determination thresholds (the first auxiliary determination threshold and the second auxiliary determination threshold) are preferably set in the fourth example embodiment described above, the present invention is not restricted to this. In an example embodiment of the present invention, one or three or more auxiliary determination thresholds may alternatively be set.

The attitude control methods described in the first to fourth example embodiments are merely examples, and the attitude control may alternatively be performed by a different method.

The speed control methods for changing the target vessel speed described in the first and second example embodiments are merely examples, and the speed control may alternatively be performed to change the target vessel speed by a different method.

While the propulsion device preferably includes an engine as a drive source in each of the first to fourth example embodiments described above, the present invention is not restricted to this. In an example embodiment of the present invention, the propulsion device may alternatively include an electric motor as a drive source.

While the controller preferably makes the high wave determination in each of the first to fourth example embodiments described above, the present invention is not restricted to this. In an example embodiment of the present invention, the controller may not make the high wave determination.

While the controller preferably makes the wave direction determination based on the target vessel speed and the current vessel speed in each of the first to fourth example embodiments described above, the present invention is not restricted to this. In an example embodiment of the present invention, the controller may alternatively make the wave direction determination based on an index different from the target vessel speed and the current vessel speed.

While the propulsion device preferably includes an engine including a throttle valve in each of the first to fourth example embodiments described above, the present invention is not restricted to this. In an example embodiment of the present invention, the propulsion device may alternatively include an electric motor as a drive source to generate a thrust instead of an engine. In such a case, the controller performs the attitude control by reducing the output of the electric motor to reduce the vessel speed. The propulsion device may alternatively include both an engine including a throttle valve and an electric motor.

While the output of the engine is preferably adjusted by adjusting the opening of the throttle valve in each of the first to fourth example embodiments described above, the present invention is not restricted to this. In an example embodiment of the present invention, the output of the engine may alternatively be adjusted by cutting fuel injection into a combustion chamber, reducing the amount of fuel injection into the combustion chamber, cutting ignition in the combustion chamber, or adjusting valve timing, for example, rather than by adjusting the opening of the throttle valve.

While one outboard motor is preferably provided on the hull in each of the first to fourth example embodiments described above, the present invention is not restricted to this. In an example embodiment of the present invention, a plurality of outboard motors may alternatively be provided on the hull.

While the process operations performed by the controller are described using a flowchart in a flow-driven manner in which processes are performed in order along a process flow for the convenience of illustration in each of the first to fourth example embodiments described above, the present invention is not restricted to this. In an example embodiment of the present invention, the process operations performed by the controller may alternatively be performed in an event-driven manner in which the processes are performed on an event basis. In this case, the process operations performed by the controller may be performed in a complete event-driven manner or in a combination of an event-driven manner and a flow-driven manner.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine propulsion system comprising:
a propulsion device to be provided on or in a hull;
an up-and-down movement sensor to measure at least one of an up-and-down speed or an up-and-down acceleration of the hull; and
a controller configured or programmed to control driving of the propulsion device, and perform a wave control including an attitude control to reduce an up-and-down attitude change of the hull by temporarily reducing a vessel speed based on a measurement result of the up-and-down movement sensor each time a marine vessel rides over a wave; wherein
the controller is configured or programmed to, in the wave control, make a wave direction determination to determine whether a wave condition relative to the hull is a head wave or a following wave based on at least the measurement result of the up-and-down movement sensor, perform the attitude control when it is determined that the wave condition is the head wave, and not perform the attitude control when it is determined that the wave condition is the following wave.

2. The marine propulsion system according to claim 1, wherein
the wave control includes a speed control to adjust the vessel speed to a target vessel speed, which is a target value of the vessel speed, to reduce an impact on the hull when the marine vessel rides over a wave; and
the controller is configured or programmed to perform the speed control regardless of the head wave or the following wave.

3. The marine propulsion system according to claim 2, wherein
the controller is configured or programmed to perform the speed control regardless of whether a result of the wave direction determination is the head wave or the following wave.

4. The marine propulsion system according to claim 3, wherein the controller is configured or programmed to, in the speed control, adjust the vessel speed based on a moving average value of the up-and-down speed or the up-and-down acceleration of the hull, and set the target vessel speed based on the moving average value when making the wave direction determination.

5. The marine propulsion system according to claim 2, wherein the controller is configured or programmed to make the wave direction determination based on at least the target vessel speed.

6. The marine propulsion system according to claim 5, wherein the target vessel speed includes a limited target vessel speed in which a predetermined limit is set on an amount of change of the vessel speed such that a difference between an actual vessel speed and the target value of the vessel speed is reduced.

7. The marine propulsion system according to claim 2, wherein
the controller is configured or programmed to, in the wave direction determination, determine that the wave condition is the head wave and perform the attitude control when it is determined that a determination vessel speed difference, which is a difference between the target vessel speed and the vessel speed at a start of the speed control, is greater than a predetermined wave direction determination threshold, and determine that the wave condition is the following wave and not perform the attitude control when it is determined that the predetermined determination vessel speed difference is equal to or less than the wave direction determination threshold.

8. The marine propulsion system according to claim 2, wherein
in the speed control, an upper limit is set on a rate of change of an actual vessel speed toward the target vessel speed; and
the controller is configured or programmed to perform a control to increase the upper limit for the rate of change when a difference between the target vessel speed and the actual vessel speed is equal to or greater than a first threshold.

9. The marine propulsion system according to claim 2, wherein, when the speed control is being performed and the attitude control is not being performed even when the controller determines that the wave direction is the head wave, the controller is configured or programmed to perform the attitude control in addition to the speed control when it is determined that the up-and-down speed or the up-and-down acceleration of the hull is equal to or higher than a second threshold based on the measurement result of the up-and-down movement sensor.

10. The marine propulsion system according to claim 2, wherein the controller is configured or programmed to, in the speed control, change the vessel speed based on a moving average value of the up-and-down speed or the up-and-down acceleration of the hull and an occurrence probability density distribution of a wave height to reduce an up-and-down acceleration and deceleration of the hull.

11. The marine propulsion system according to claim 1, wherein
the propulsion device includes at least one of an engine or an electric motor as a drive source to generate a thrust; and
the controller is configured or programmed to perform the attitude control by reducing an output of the engine or the electric motor to reduce the vessel speed.

12. The marine propulsion system according to claim 1, further comprising:
an attitude adjuster on the hull to adjust a pitch of the hull by changing a position of the attitude adjuster with respect to the hull; wherein
the controller is configured or programmed to perform the attitude control to adjust an attitude of the hull by varying the pitch of the hull using the attitude adjuster.

13. The marine propulsion system according to claim 1, wherein the controller is configured or programmed to, in the wave control, make a high wave determination to determine whether or not the up-and-down speed or the up-and-down acceleration of the hull is equal to or higher than a predetermined high wave determination threshold based on the measurement result of the up-and-down movement sensor, and perform the attitude control regardless of a result of the wave direction determination when it is determined that the up-and-down speed or the up-and-down acceleration of the hull is equal to or higher than the predetermined high wave determination threshold.

14. The marine propulsion system according to claim 1, further comprising:
an operator to receive an operation to start the wave control and an operation to terminate the wave control; wherein
the controller is configured or programmed to start or terminate the wave direction determination based on an operation on the operator.

15. The marine propulsion system according to claim 1, wherein the controller is configured or programmed to maintain the vessel speed without performing the attitude control when it is determined that the wave condition is the following wave.

16. The marine propulsion system according to claim 1, wherein
the propulsion device includes an engine including a throttle valve; and
the controller is configured or programmed to, in the attitude control, perform a subtraction process to reduce an opening of the throttle valve based on the up-and-down speed of the hull.

17. A marine vessel comprising:
a hull; and
a marine propulsion system on or in the hull; wherein
the marine propulsion system includes:
- a propulsion device on or in the hull;
- an up-and-down movement sensor to measure at least one of an up-and-down speed or an up-and-down acceleration of the hull; and
- a controller configured or programmed to control driving of the propulsion device, and perform a wave control including an attitude control to reduce an up-and-down attitude change of the hull by temporarily reducing a vessel speed based on a measurement result of the up-and-down movement sensor each time the marine vessel rides over a wave; and the controller is configured or programmed to, in the wave control, make a wave direction determination to determine whether a wave condition relative to the hull is a head wave or a following wave based on at least the measurement result of the up-and-down movement sensor, perform the attitude control when it is determined that the wave condition is the head wave, and not perform the attitude control when it is determined that the wave condition is the following wave.

18. The marine vessel according to claim 17, wherein
the wave control includes a speed control to adjust the vessel speed to reach a target vessel speed, which is a target value of the vessel speed, to reduce an impact on the hull when the marine vessel rides over a wave; and
the controller is configured or programmed to perform the speed control regardless of the head wave or the following wave.

19. The marine vessel according to claim 18, wherein
the controller is configured or programmed to perform the speed control regardless of whether a result of the wave direction determination is the head wave or the following wave.

20. The marine vessel according to claim 18, wherein the controller is configured or programmed to make the wave direction determination based on at least the target vessel speed.

* * * * *